(12) United States Patent
Williams

(10) Patent No.: US 11,848,619 B2
(45) Date of Patent: *Dec. 19, 2023

(54) APPARATUS AND METHODS FOR SUPPLYING DC POWER TO CONTROL CIRCUITRY OF A MATRIX CONVERTER

(71) Applicant: ITT Manufacturing Enterprises LLC, Wilmington, DE (US)

(72) Inventor: Dean P. Williams, Moravia, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/885,436

(22) Filed: Aug. 10, 2022

(65) Prior Publication Data

US 2023/0070562 A1    Mar. 9, 2023

Related U.S. Application Data

(63) Continuation of application No. 16/748,585, filed on Jan. 21, 2020, now Pat. No. 11,451,156.

(51) Int. Cl.
*H02M 5/297* (2006.01)
*H02M 1/32* (2007.01)
*H02M 5/293* (2006.01)

(52) U.S. Cl.
CPC ............ *H02M 5/297* (2013.01); *H02M 1/32* (2013.01); *H02M 5/2932* (2021.05)

(58) Field of Classification Search
CPC .......................... H02M 5/292; H02M 5/297
See application file for complete search history.

(56) References Cited

U.S. PATENT DOCUMENTS

| 4,468,725 A | 8/1984 | Venturini |
|---|---|---|
| 5,491,370 A | 2/1996 | Schneider et al. |

(Continued)

FOREIGN PATENT DOCUMENTS

| CN | 101878582 A | 11/2010 |
|---|---|---|
| CN | 103296955 A | 9/2013 |

(Continued)

OTHER PUBLICATIONS

L. Empringham, J. W. Kolar, J. Rodriguez, P. W. Wheeler and J. C. Clare, "Technological Issues and Industrial Application of Matrix Converters: A Review," in IEEE Transactions on Industrial Electronics, vol. 60, No. 10, pp. 4260-4271, Oct. 2013, doi: 10.1109/TIE.2012.2216231. (Year: 2013).*

(Continued)

*Primary Examiner* — Peter M Novak
(74) *Attorney, Agent, or Firm* — Knobbe, Martens, Olson & Bear, LLP

(57) ABSTRACT

Apparatus and methods for supplying DC power to control circuitry of a matrix converter is provided. In certain embodiments, a matrix converter includes an array of switches having AC inputs for receiving a multi-phase AC input voltage and AC outputs for providing a multi-phase AC output voltage to a load, such as an electric motor. The matrix converter further includes control circuitry for opening or closing individual switches of the array, and a clamp circuit connected between the AC inputs and AC outputs of the array and operable to dissipate energy of the load in response to an overvoltage condition, such as an overvoltage condition arising during shutdown. The clamp circuit includes a switched mode power supply operable to generate a DC supply voltage for the control circuitry.

21 Claims, 17 Drawing Sheets

(56) References Cited

U.S. PATENT DOCUMENTS

| | | |
|---|---|---|
| 5,763,969 A | 6/1998 | Metheny et al. |
| 5,852,559 A | 12/1998 | Li |
| 5,939,807 A | 8/1999 | Patyk et al. |
| 5,960,535 A | 10/1999 | Rubens |
| 6,065,946 A | 5/2000 | Lathrop |
| 6,177,740 B1 | 1/2001 | Burns |
| 6,198,183 B1 | 3/2001 | Baeumel et al. |
| 6,249,068 B1 | 6/2001 | Knopp |
| 6,307,337 B1 | 10/2001 | Nelson |
| 6,496,343 B2 | 12/2002 | Mahlein et al. |
| 6,559,532 B1 | 5/2003 | Schwarzbauer et al. |
| 6,603,647 B2 | 8/2003 | Briesen et al. |
| 6,683,801 B2 | 1/2004 | Bruckmann et al. |
| 6,704,182 B2 | 3/2004 | Bruckmann et al. |
| 6,704,215 B2 | 3/2004 | Simon |
| 6,711,038 B2 | 3/2004 | Ziegler et al. |
| 6,744,650 B2 | 6/2004 | Briesen et al. |
| 6,760,239 B2 | 7/2004 | Schierling et al. |
| 6,856,038 B2 | 2/2005 | Rebsdorf et al. |
| 7,180,212 B2 | 2/2007 | Anwar |
| 7,199,496 B2 | 4/2007 | Suzuki et al. |
| 7,362,017 B2 | 4/2008 | Piper et al. |
| 7,394,627 B2 | 7/2008 | Bruckmann et al. |
| 7,626,840 B2 | 12/2009 | Ueda |
| 7,633,771 B2 | 12/2009 | Sack |
| 7,701,740 B2 | 4/2010 | Yamanaka |
| 7,781,925 B2 | 8/2010 | Lacaze |
| 7,848,121 B2 | 12/2010 | Kojori et al. |
| 7,881,087 B2 | 2/2011 | Sakakibara et al. |
| 7,911,093 B2 | 3/2011 | Schueren |
| 8,007,565 B2 | 8/2011 | Moredock |
| 8,159,851 B2 | 4/2012 | Hara et al. |
| 8,216,330 B2 | 7/2012 | Moredock et al. |
| 8,243,482 B2 | 8/2012 | Ueda et al. |
| 8,310,121 B2 | 11/2012 | Fujita et al. |
| 8,564,997 B2 | 10/2013 | Urushibata et al. |
| 8,576,528 B2 | 11/2013 | Nagano et al. |
| 8,670,257 B2 | 3/2014 | Hiramatsu et al. |
| 8,810,086 B2 | 8/2014 | Best et al. |
| 8,829,723 B2 | 9/2014 | Gravovac et al. |
| 8,837,119 B2 | 9/2014 | Kishimoto et al. |
| 8,931,528 B2 | 1/2015 | Hsiung |
| 8,964,424 B2 | 2/2015 | Sakakibara |
| 9,112,414 B2 | 8/2015 | Inomata et al. |
| 9,219,424 B2 | 12/2015 | Inomata et al. |
| 9,238,918 B2 | 1/2016 | McKinzie |
| 9,276,486 B2 | 3/2016 | Yamazaki et al. |
| 9,276,489 B2 | 3/2016 | Fujita et al. |
| 9,318,992 B2 | 4/2016 | Swamy |
| 9,356,494 B2 | 5/2016 | Motoda |
| 9,407,135 B2 | 8/2016 | Kinomura et al. |
| 9,419,552 B2 | 8/2016 | Schock et al. |
| 9,450,501 B2 | 9/2016 | Inomata |
| 9,531,239 B2 | 12/2016 | Maschke et al. |
| 9,543,851 B2 | 1/2017 | Ebisu et al. |
| 9,564,797 B2 | 2/2017 | Kagimura et al. |
| 9,667,124 B2 | 5/2017 | Utsumi et al. |
| 9,705,420 B2 | 7/2017 | Quevedo et al. |
| 9,812,920 B2 | 11/2017 | McKinzie et al. |
| 9,822,782 B2 | 11/2017 | McKinzie |
| 10,063,179 B2 | 8/2018 | Swamy |
| 10,090,738 B2 | 10/2018 | Schock et al. |
| 10,119,528 B2 | 11/2018 | Fujii et al. |
| 10,345,056 B2 | 7/2019 | Rollins et al. |
| 10,367,425 B2 | 7/2019 | Morihara et al. |
| 10,715,010 B2 | 7/2020 | Palmer et al. |
| 10,804,830 B1 | 10/2020 | Zhang et al. |
| 10,855,146 B2 | 12/2020 | Williams et al. |
| 10,928,144 B2 | 2/2021 | Rollins et al. |
| 11,183,896 B2 | 11/2021 | Guedes-Pinto et al. |
| 11,394,264 B2 | 7/2022 | Williams et al. |
| 11,451,156 B2 | 9/2022 | Williams |
| 2001/0021116 A1 | 9/2001 | Bruckmann et al. |
| 2002/0158524 A1 | 10/2002 | Bobay |
| 2007/0177407 A1* | 8/2007 | Bruckmann .......... H02M 5/458 363/8 |
| 2008/0181791 A1* | 7/2008 | Iguchi .................. F04C 23/008 417/366 |
| 2009/0039741 A1 | 2/2009 | Heining |
| 2010/0126703 A1 | 5/2010 | Ruan et al. |
| 2010/0149848 A1 | 6/2010 | Urushibata et al. |
| 2011/0101804 A1 | 5/2011 | Isoda |
| 2011/0176340 A1 | 7/2011 | Sakakibara |
| 2012/0020021 A1 | 1/2012 | Kishimoto et al. |
| 2012/0081058 A1* | 4/2012 | Bortolus .............. H02K 11/001 318/494 |
| 2012/0113693 A1 | 5/2012 | Sekimoto et al. |
| 2012/0147634 A1 | 6/2012 | Jones |
| 2012/0235663 A1 | 9/2012 | Bayerer et al. |
| 2013/0076141 A1 | 3/2013 | Paulakonis et al. |
| 2013/0127251 A1 | 5/2013 | Graovac et al. |
| 2013/0328424 A1 | 12/2013 | Goto |
| 2014/0104887 A1* | 4/2014 | Mayell ............. H02M 3/33515 327/318 |
| 2014/0139059 A1 | 5/2014 | De Filippis |
| 2014/0306361 A1 | 10/2014 | Pugh |
| 2015/0076970 A1 | 3/2015 | Oowatari |
| 2015/0229233 A1 | 8/2015 | Quevedo et al. |
| 2016/0276895 A1* | 9/2016 | Aizawa ................. H02K 3/522 |
| 2017/0264171 A1 | 9/2017 | Williams et al. |
| 2018/0309343 A1 | 10/2018 | Tolksdorf et al. |
| 2019/0123636 A1* | 4/2019 | Moallem ................ H02S 40/32 |
| 2020/0212756 A1 | 7/2020 | Zhong |
| 2020/0251259 A1 | 8/2020 | Rao et al. |
| 2020/0343792 A1 | 10/2020 | Palmer et al. |
| 2021/0123441 A1 | 4/2021 | Coupart |
| 2021/0123442 A1 | 4/2021 | Schrader |
| 2021/0135549 A1 | 5/2021 | Lee |
| 2021/0152060 A1 | 5/2021 | Williams et al. |
| 2021/0164740 A1 | 6/2021 | Rollins et al. |
| 2021/0218304 A1 | 7/2021 | Schuler et al. |
| 2021/0226498 A1 | 7/2021 | Williams et al. |
| 2021/0226551 A1 | 7/2021 | Williams |
| 2021/0288561 A1 | 9/2021 | Kato |
| 2021/0305871 A1 | 9/2021 | Yamakage et al. |
| 2021/0376695 A1 | 12/2021 | Williams et al. |
| 2022/0014077 A1 | 1/2022 | Williams et al. |
| 2022/0021283 A1 | 1/2022 | Williams et al. |
| 2022/0021284 A1 | 1/2022 | Williams et al. |
| 2022/0302786 A1 | 9/2022 | Williams et al. |

FOREIGN PATENT DOCUMENTS

| | | |
|---|---|---|
| CN | 103780072 B | 4/2017 |
| CN | 106911277 A | 6/2017 |
| DE | 9111719 U1 | 11/1991 |
| DE | 9305174 | 11/1993 |
| DE | 19618996 | 11/1997 |
| DE | 19622396 | 12/1997 |
| DE | 19703655 | 1/2000 |
| DE | 20004437 | 6/2000 |
| DE | 10005449 | 6/2008 |
| EP | 149533 | 7/1985 |
| EP | 0812052 | 12/1997 |
| EP | 1311057 | 5/2003 |
| EP | 1973222 | 9/2008 |
| EP | 1495533 | 3/2009 |
| EP | 2157689 | 2/2010 |
| EP | 2178199 | 4/2010 |
| EP | 2299583 | 3/2011 |
| EP | 2156541 B1 | 11/2012 |
| EP | 2528212 | 11/2012 |
| EP | 2605252 A1 | 6/2013 |
| EP | 2849549 A1 | 3/2015 |
| EP | 3151403 | 4/2017 |
| JP | S5715401 A | 1/1982 |
| JP | 2008-079381 | 4/2008 |
| JP | 2008-295219 | 12/2008 |
| JP | 2015/099829 A | 5/2015 |
| WO | WO 2002/35885 A1 | 5/2002 |

(56) References Cited

FOREIGN PATENT DOCUMENTS

WO    WO 2009/069103 A2    6/2009
WO    WO 2019/011444       1/2019

OTHER PUBLICATIONS

Apap, Maurice. "Direct Converter Technology Applied to an Integrated Motor Drive". Doctor of Philosophy Thesis, Dec. 2005.
Casadei, Domenico et al., "Optimal Use of Zero Vectors for Minimizing the Output Current Distortion in Matrix Converters", IEEE Transactions on Industrial Electronics, vol. 56, No. 2, Feb. 2009, pp. 326-336.
Chinese Office Action for Application No. 201780015441.0, dated Oct. 28, 2019 with English translation in 21 pages.
International Preliminary Report on Patentability for PCT/US2017/022019, dated Sep. 11, 2018 in 9 pages.
International Search Report and Written Opinion for PCT Application No. PCT/US2017/022019, dated Jul. 27, 2017 in 12 pages.
International Search Report and Written Opinion for PCT/US2021/014160, dated Apr. 29, 2021, in 13 pages.
International Preliminary Report on Patentability and Written Opinion for PCT/US2021/014160, dated Jul. 26, 2022, in 8 pages.
International Search Report and Written Opinion in US Application No. PCT/US2021/014156 dated Apr. 20, 2021 in 15 pages.
International Preliminary Report on Patentability and Written Opinion for PCT/US2021/014156, dated Jul. 26, 2022, in 6 pages.
Wheeler, P.W. et al. "A Fully Integrated 30KW Motor Drive Using Matrix Converter Technology", IEEE Xplore, pp. 2390-2395, downloaded on Mar. 25, 2009.

\* cited by examiner

APPARATUS AND METHODS FOR SUPPLYING DC POWER TO CONTROL CIRCUITRY OF A MATRIX CONVERTER

BACKGROUND

Field

This disclosure relates generally to electric motors, and more particularly to supplying DC power to control circuitry of a matrix converter for an electric motor.

Description of the Related Art

Electric motors can be used in a wide variety of applications. One such example is industrial pumps, which are used to pump fluids, such as chemicals, in an industrial setting (e.g., a chemical manufacturing plant). Such pumps include an electric motor to drive the pump (e.g., drive the rotation of the pump impeller).

SUMMARY

In one aspect, a matrix converter configured as a motor drive circuit of an electric motor is provided. The matrix converter includes an array of switches including a plurality of AC inputs configured to receive a multi-phase AC input voltage and a plurality of AC outputs configured to output a multi-phase AC output voltage, control circuitry configured to control the array of switches to synthesize the multi-phase AC output voltage from the multi-phase AC input voltage, and a clamp circuit electrically connected between the plurality of AC inputs and the plurality of AC outputs. The clamp circuit includes a switched mode power supply operable to generate a DC supply voltage for the control circuitry.

In another aspect, a method of supplying DC power in a matrix converter is provided. The method includes controlling an array of switches using control circuitry to synthesize a multi-phase AC output voltage from a multi-phase AC input voltage, activating a clamp circuit connected between a plurality of AC outputs and a plurality of AC inputs of the array of switches in response to an overvoltage condition, and generating a DC supply voltage for the control circuitry using a switched mode power supply of the clamp circuit.

In another aspect, a matrix converter is provided. The matrix converter includes a switch array having a plurality of AC inputs and a plurality of AC outputs, the switch array including a plurality of bidirectional switches. The matrix converter further includes a plurality of driver circuits each configured to control a respective one of the plurality of bidirectional switches, a control circuit configured to provide a plurality of input signals to the plurality of driver circuits, and a clamp circuit electrically connected between the plurality of AC inputs and the plurality of AC outputs. The clamp circuit includes a switched mode power supply operable to generate a DC supply voltage for the control circuit.

DETAILED DESCRIPTION

Figure 1A:
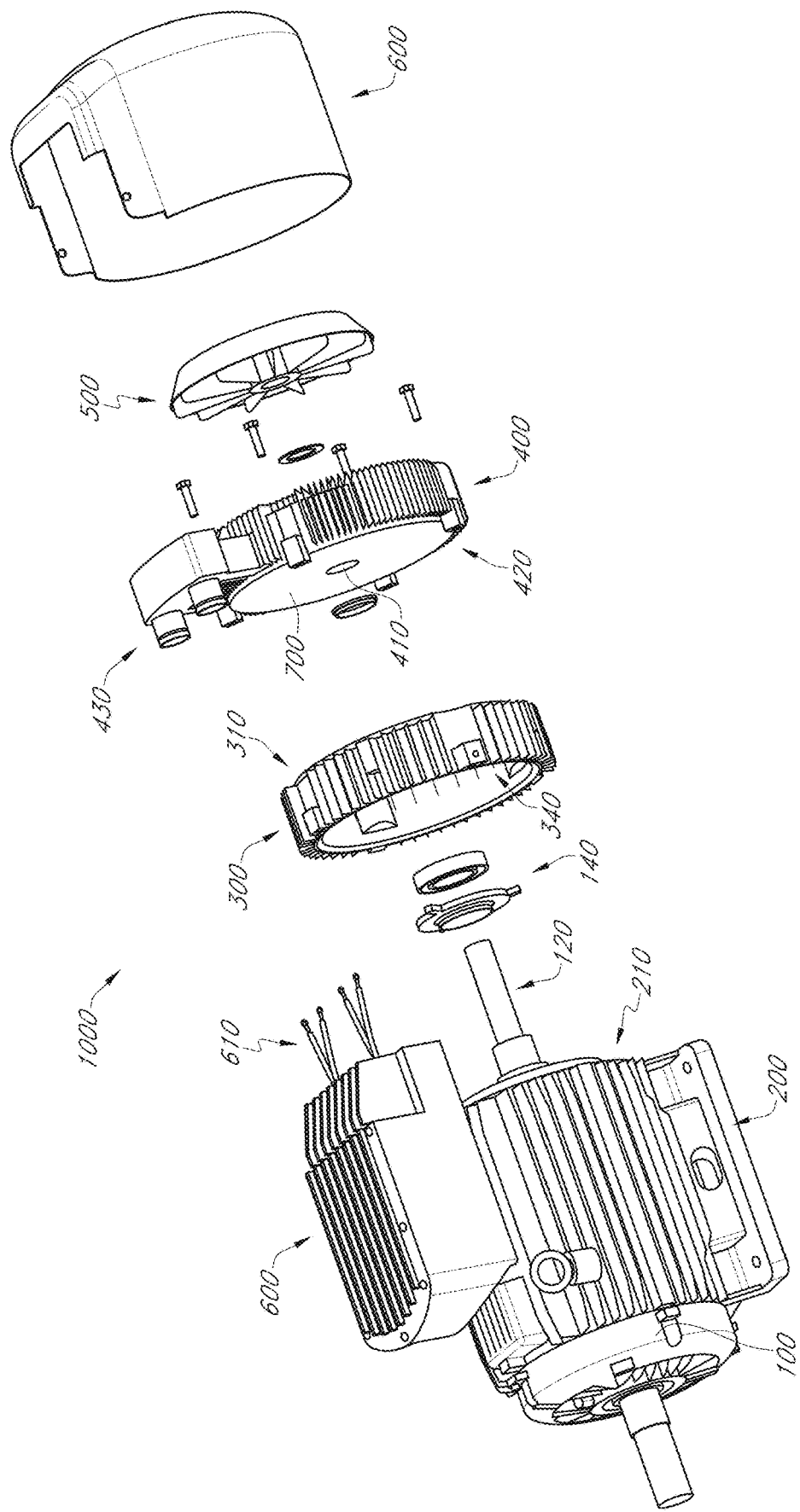
FIG. 1A is an exploded view of an electric motor assembly for driving a pump or rotary device.
Figure 1B:
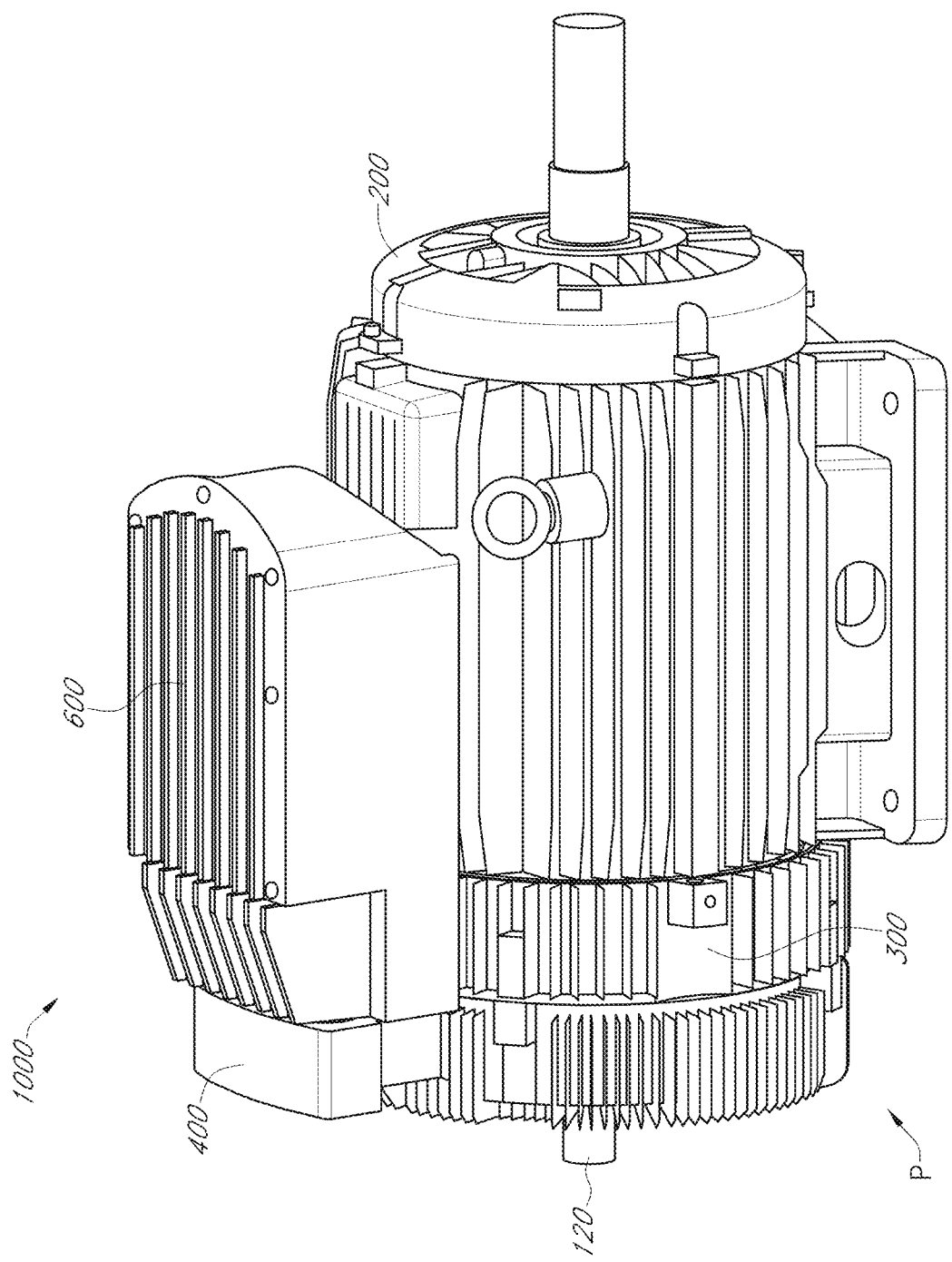
FIG. 1B is a partially assembled view of the electric motor assembly of FIG. 1A, excluding the fan and shroud cover.

FIGS. 1A-2A show an example motor assembly 1000. The motor assembly 1000 can be coupled to a pump (not shown) to drive the pump. The motor assembly 1000 includes an electric motor 100 with an output shaft or rotor 120. The motor 100 can be housed in a motor frame 200 so that the output shaft or rotor 120 protrudes from an end 210 of the motor frame 200. As shown, a second end of the output shaft or rotor 120 protrudes from the other end of the motor frame 200, and may be coupled to the pump. The motor assembly 1000 can include a plate assembly P removably coupleable over the output shaft or rotor 120 to the motor frame 200. The plate assembly P can include one or both of a mid-plate 300 and an end-plate 400. The plate assembly P includes a bearing 140 via which it couples to the output shaft or rotor 120.

Figure 7:
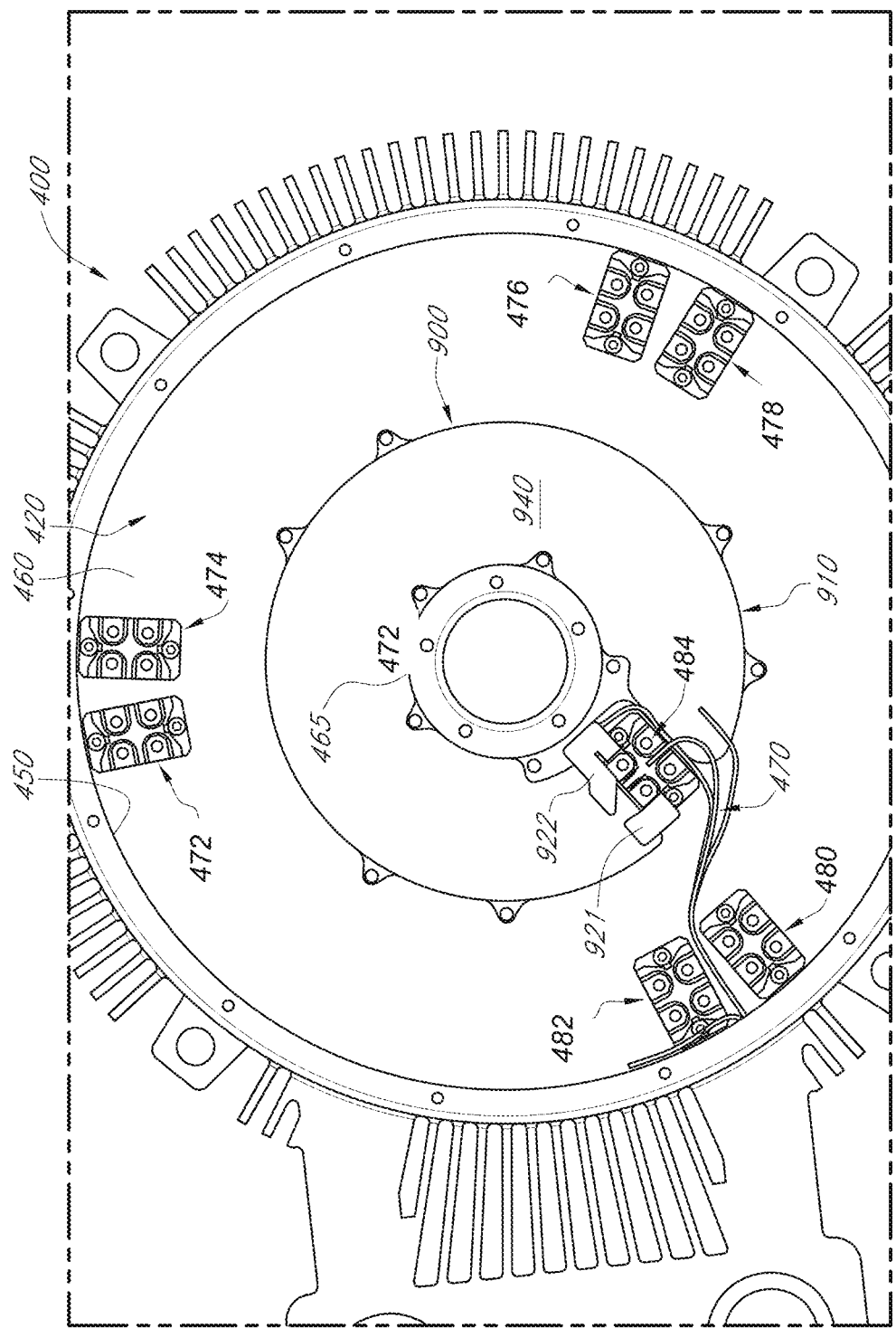
FIG. 7 is schematic perspective view of the chamber of an end-plate of the electric motor assembly with the resistor case of FIG. 5 mounted therein.

The mid-plate 300 can couple to the output shaft or rotor 120 via the bearing 140, which can be disposed in an opening 320 (e.g., bearing housing or sleeve) of the mid-plate 300 (see, e.g., FIGS. 2B and 7). The mid-plate 300 can be disposed adjacent the end 210 of the motor frame 200 and has a recess or cavity 340 that faces the motor frame 200. The mid-plate 300 can have one or more (e.g., a plurality of) heat sink fins 310 extending from an outer surface (e.g., outer peripheral surface) of the mid-plate 300 to facilitate heat dissipation.

The end-plate 400 can coupled to the mid-plate 300 so that the mid-plate 300 is interposed between the end 210 of the motor frame 200 and the end-plate 400. The output shaft or rotor 120 extends through an opening 410 in the end-plate 400. The end-plate 400 can have a cavity 420, defined at least in part by an end wall 460, that receives an electronic module 700 therein, which is further discussed below.

A fan 500 couples to the output shaft or rotor 120 so that the end-plate 400 is interposed between the fan 500 and the mid-plate 300. The fan 500 is rotatably coupled to the output shaft or rotor 120 such that rotation of the output shaft or rotor 120 rotates the fan 500.

A shroud cover 600 can be removably disposed over the mid-plate 300, end-plate 400 and fan 500. The shroud cover 600 can removably attach (e.g., with one or more fasteners, such as screws or bolts) to the motor frame 200.

The motor assembly 1000 can further include a terminal box 600 attached to the motor frame 200. The terminal box 600 has connector wires 610 that can extend into channels 430 of a terminal box connector 440 (see FIG. 8) of the end-plate 400 to electrically connect electronics in the terminal box 600 with electronic module 700 (see FIG. 8) in the end-plate 400. The mid-plate 300 and end-plate 400 can be made of copper, aluminum or cast iron.

Figure 2:
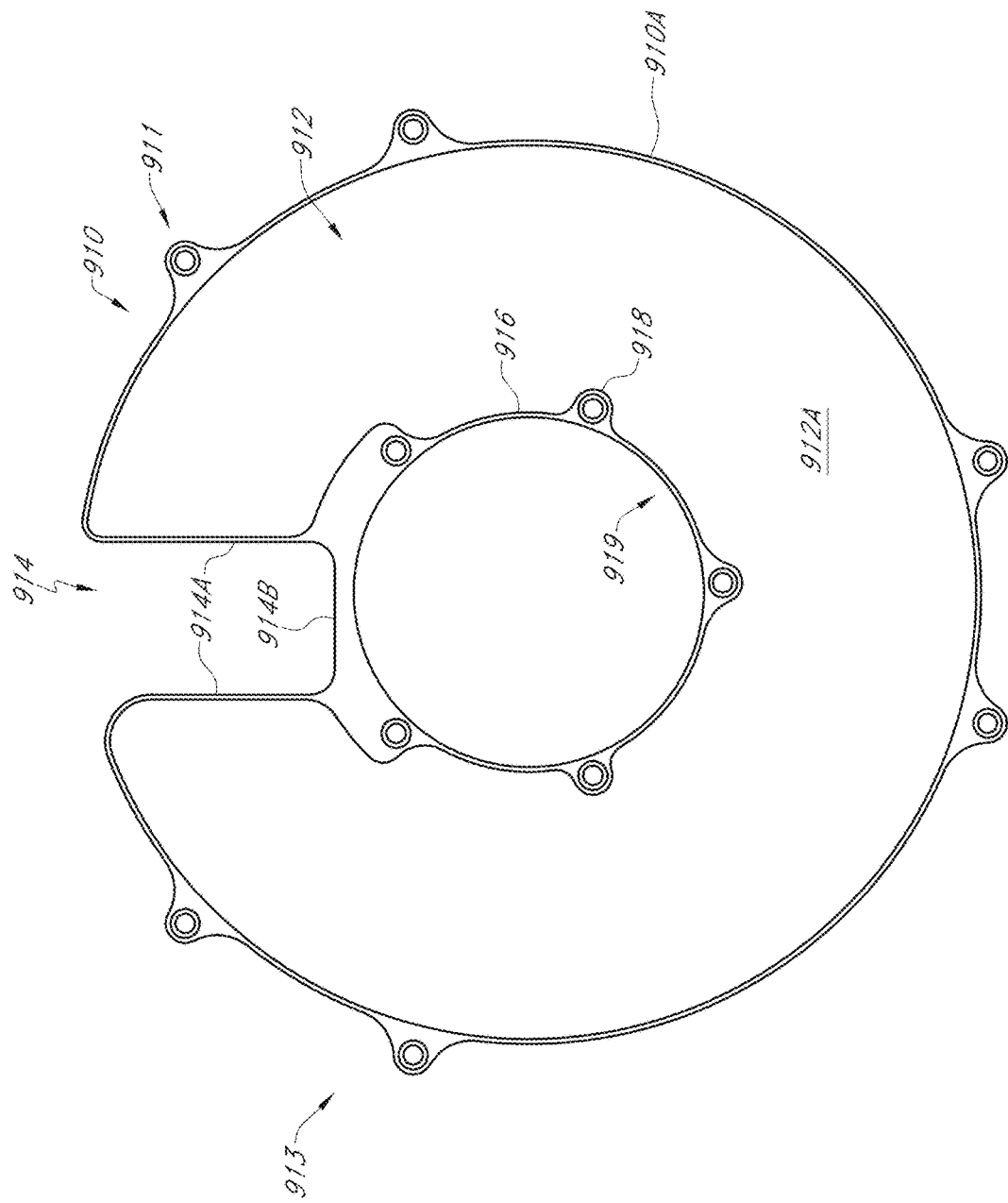
FIG. 2 is a schematic front view of a resistor case for use with the electric motor assembly.

FIG. 2 shows a front side 913 of a case 910 for use with the electric motor assembly 1000. In one implementation, the case 910 can be made of aluminum. However, the case 910 can be made of other suitable materials (e.g., other suitable metals). The case 910 can at least partially house a resistor 920 (see FIG. 3) as further discussed below. The case 910 has a curved outer wall 910A. In one implementation, the curved outer wall 910A can have a generally circular shape. The case 910 can include one or more (e.g., a plurality of) fastener openings 911 along at least a portion of the curved outer wall 910A. The fastener opening(s) 911 can receive a fastener (e.g., bolt, screw) therethrough.

The case 910 has a curved inner wall 916. In one implementation, the curved inner wall 916 has a circular shape that defines a central opening 919 (e.g., a circular opening) of the case 910. The case 910 can include one or more (e.g., a plurality of) fastener openings 918 along at least a portion of the curved inner wall 916. The fastener opening(s) 918 can receive a fastener (e.g., bolt, screw) therethrough.

The case 910 has a recess or cavity 912 defined at least in part by and between a base surface 912A, the curved outer wall 910A and the curved inner wall 916. The case 910 includes a cutout or slot 914 defined by a pair of spaced apart walls 914A (e.g., generally parallel walls) that extend inward from the curved outer wall 910A to a base wall 914B proximate the opening 919.

Figure 3:
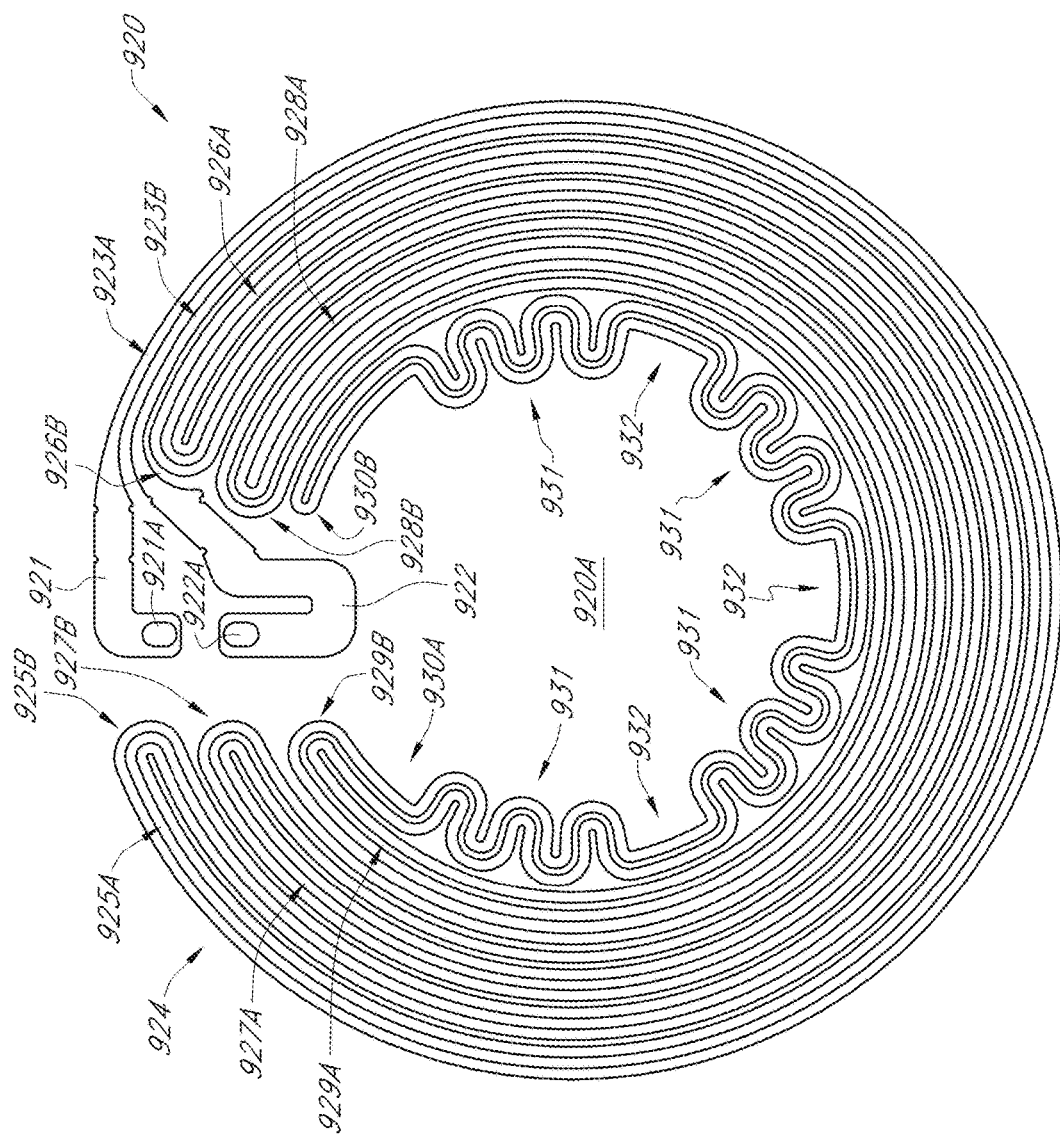
FIG. 3 is a schematic planar view of a clamp resistor for use with the electric motor assembly.

FIG. 3 shows a top view of the resistor 920. The resistor 920 can be a low inductance resistor for a matrix converter, as further discussed below. The resistor 920 can be a clamp resistor used in the clamp of the matrix converter to limit an amount of current when clamping. Absent inclusion of the resistor 920, the amount of current flowing through the clamp may be high so as to cause damage to the clamp.

The resistor 920 has a generally circular shape and extends about an opening 920A generally at the center of the resistor 920. The resistor 920 can include an input connector 921 with a ring connection 921A and an output connector 922 with a ring connection 922A. The resistor 920 includes conductor elements 923A, 923B that extend from the input and output connectors 921, 922, respectively, and follow a curved serpentine path that defines a generally circular outer perimeter 924. The conductor elements 923A, 923B can be made of copper or other suitable electrically conductive material.

The conductor elements 923A, 923B extend substantially parallel to each other as they follow the curved serpentine path. As shown in FIG. 3, the conductor elements 923A, 923B define a first arcuate path 925A that extends from the connectors 921, 922 to a curved end 925B opposite the connectors 921, 922 and doubles back to extends along a second arcuate path 926A (e.g., shorter than the first arcuate path 925A) that extends to a curved end 926B proximate the connectors 921, 922. The conductor elements 923A, 923B double back from the curved end 926B and extend along a third arcuate path 927A (e.g., shorter than the second arcuate path 926A) to a curved end 927B opposite the connectors 921, 922. The conductor elements 923A, 923B double back from the curved end 927B and extend along a fourth arcuate path 928A (e.g., shorter than the third arcuate path 927A) to a curved end 928B proximate the connectors 921, 922. The conductor elements 923A, 923B double back from the curved end 928B and extend along a fifth arcuate path 929A (e.g., shorter than the fourth arcuate path 928A) to a curved end 929B opposite the connectors 921, 922. The conductor elements 923A, 923B double back from the curved end 929B and extend along a curved serpentine path 930A to an end 930B. The curved serpentine path 930A can include alternating switch-back portions 931 (e.g., with three switch back turns) and straight portions 932.

In one implementation, the resistor 920 can be housed in the case 910 so that the connectors 921, 922 extend into the cutout or slot 914, and the rest of the resistor 920 (e.g., the first to fifth arcuate paths 925A, 926A, 927A, 928A, 929A and curved serpentine path 930A) are disposed in the recess or cavity 912 so that the opening 920A is generally centered over the opening 919 (e.g., so that curved serpentine wall 930A is disposed between the curved inner wall 916 and the fifth arcuate path 929A). In another implementation, the resistor 920 and case 910 are a single piece (e.g. monolithic). For example, the resistor 920 can be defined by at least a portion of a surface (e.g., base surface 912A) of the case 910. In another implementation, additionally or alternatively, the case 910 and the plate assembly P (e.g., the end-plate 400) can be a single piece (e.g., monolithic, not detachable, without seams). For example, the case 910 can be defined or formed by at least a portion of the end wall 460 of the end-plate 400.

The resistor 920 can be made of high temperature electrical insulators (e.g., one or more sheets of thin electrical insulators (e.g., Teflon, silicon, fiberglass, rock wool). In one example, the resistor element (e.g., conductor elements 923A, 923B) can be disposed between electrical insulator layers or sheets. In one example, the dielectric material 920 can seal the case 910, allowing the resistor assembly 900 to be immersed in a bath of oil.

In certain embodiments including the one illustrated in FIG. 3, the resistor 920 can be substantially planar (e.g., flat) so that the resistor 920 (e.g., the conductor elements 923A, 923B) extends generally along a single plane (e.g., has a planar profile or form factor). The conductor elements 923A, 923B can have a planar or flat form factor or profile. The substantially planar (e.g., flat) profile or form factor of the resistor 920 allows the resistor 920 to be integrated in (e.g., fit within) the recess or cavity 912 of the case 910. Moreover, the generally planar profile of the resistor 920 and case 910 facilitates incorporation of the resistor assembly 900 into the cavity 420 of the end plate 400 (see, e.g., FIG. 7), maintaining a compact overall form factor for the motor assembly 1000. For example, the thickness of the resistor 920 and the case 910 along the central axis of the motor assembly 1000 can be substantially less than the depth of the cavity 420 within the end-plate 400 along the central axis, such that the cavity 420 can comfortably accommodate the resistor assembly 900. For instance, the thickness of the resistor 900 and/or the case 910 can in various embodiments be less than about 5, 10, 15, 20, or 25 percent of the depth of the cavity 420 within the end-plate 400.

Figure 4A:
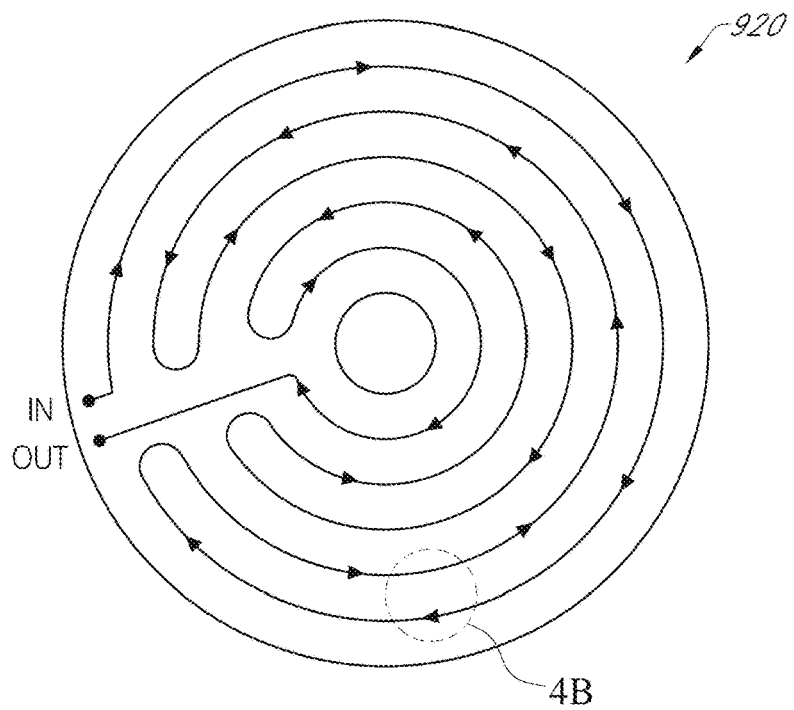
FIG. 4A is schematic illustrations of the clamp resistor of FIG. 3 during operation.
Figure 4B:
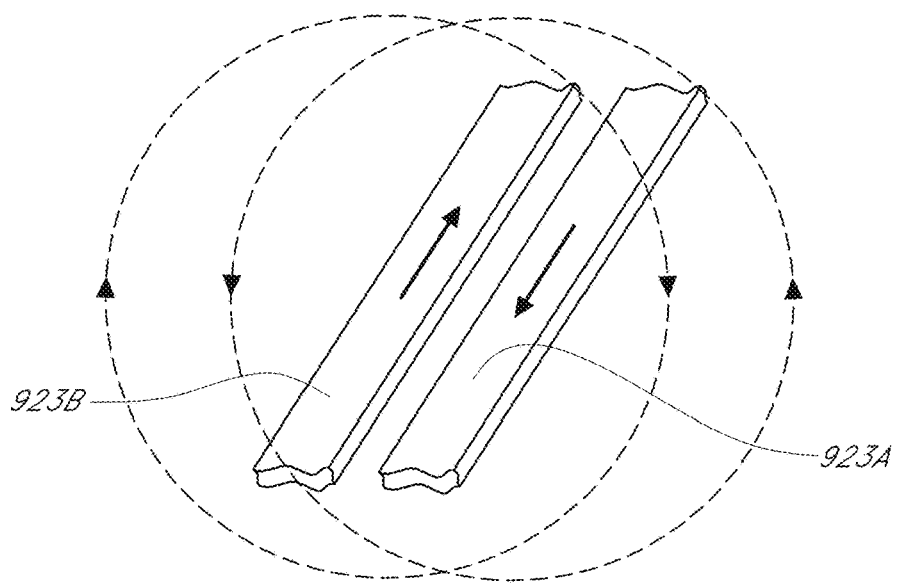
FIG. 4B is an enlarged schematic view of a portion of the clamp resistor of FIG. 4A during operation.

FIGS. 4A-4B show a schematic illustration of the resistor 920 in operation. Current is applied to the input connector 921 and exits via the output connector 922. Current flows through the conductor elements 923A, 923B in a curved serpentine manner, as shown, where current flows in one direction along the conductor element 923A and flows in an opposite direction along the conductor element 923B that is adjacent the conductor element 923A. Advantageously, the curved serpentine routing of the conductor elements 923A, 923B results in the magnetic fields generated in response to the current flowing through the conductor elements 923A, 923B cancelling each other out. This advantageously results in the resistor 920 having a low inductance, thereby avoiding parasitic inductance that can lead to large voltages across the resistor 920 during clamping.

FIG. 4B shows an enlarged partial view of the resistor 920 in FIG. 4A, showing the current flowing in one direction in the conductor element 923A, and current flowing in an opposite direction in the adjacent conductor element 923B so that the magnetic fields generated by the current flow in the conductor elements 923A, 923B cancel each other out, resulting in the resistor 920 having low inductance.

Figure 5:
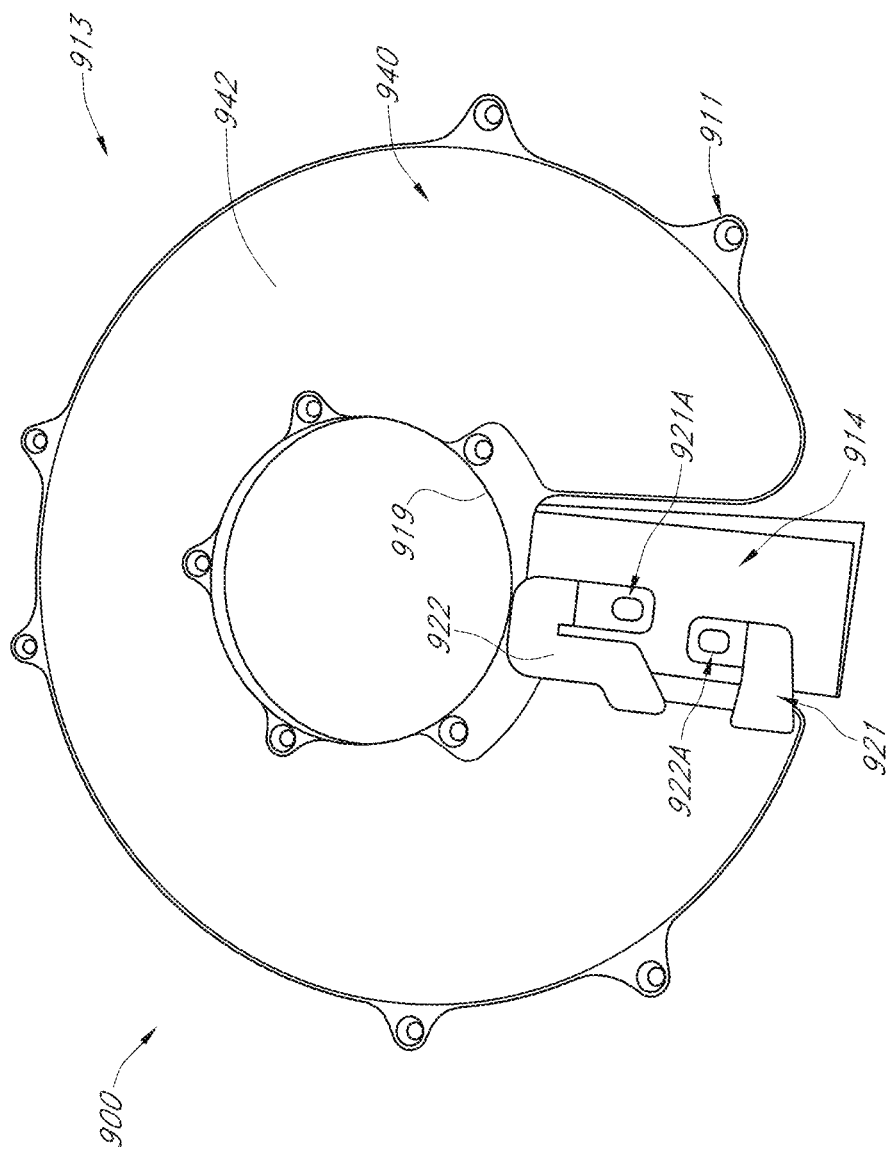
FIG. 5 is schematic planar view of a front surface of the resistor case of FIG. 2 with the clamp resistor of FIG. 3 disposed therein and covered by a dielectric material.

FIG. 5 shows a perspective view of the front side 913 of the case 910 with the resistor 920 (e.g., clamp resistor) disposed in the recess or cavity 912 so that the connectors 921, 922 extend into the cutout or slot 914 and the conductor elements 923A, 923B are disposed in the recess or cavity 912 as discussed above. A dielectric material 940 is disposed over the conductor elements 923A, 923B and at least partially fills (e.g., completely fills) the recess or cavity 912 of the case 910 so as to define a surface 942 (e.g., so no portion of the conductor elements 923A, 923B is visible or exposed), and to define a resistor assembly 900 (e.g., a clamp resistor assembly). The surface 942 can be generally coplanar with a plane that intersects an edge of the curved outer wall 910A and curved inner wall 916. In one implementation, the dielectric material 940 is a ceramic material. However, other suitable dielectric materials can be used. For example, the dielectric material 940 can be epoxy (a potting compound) that can suspend the resistor 920 in the recess or cavity 912.

Figure 6:
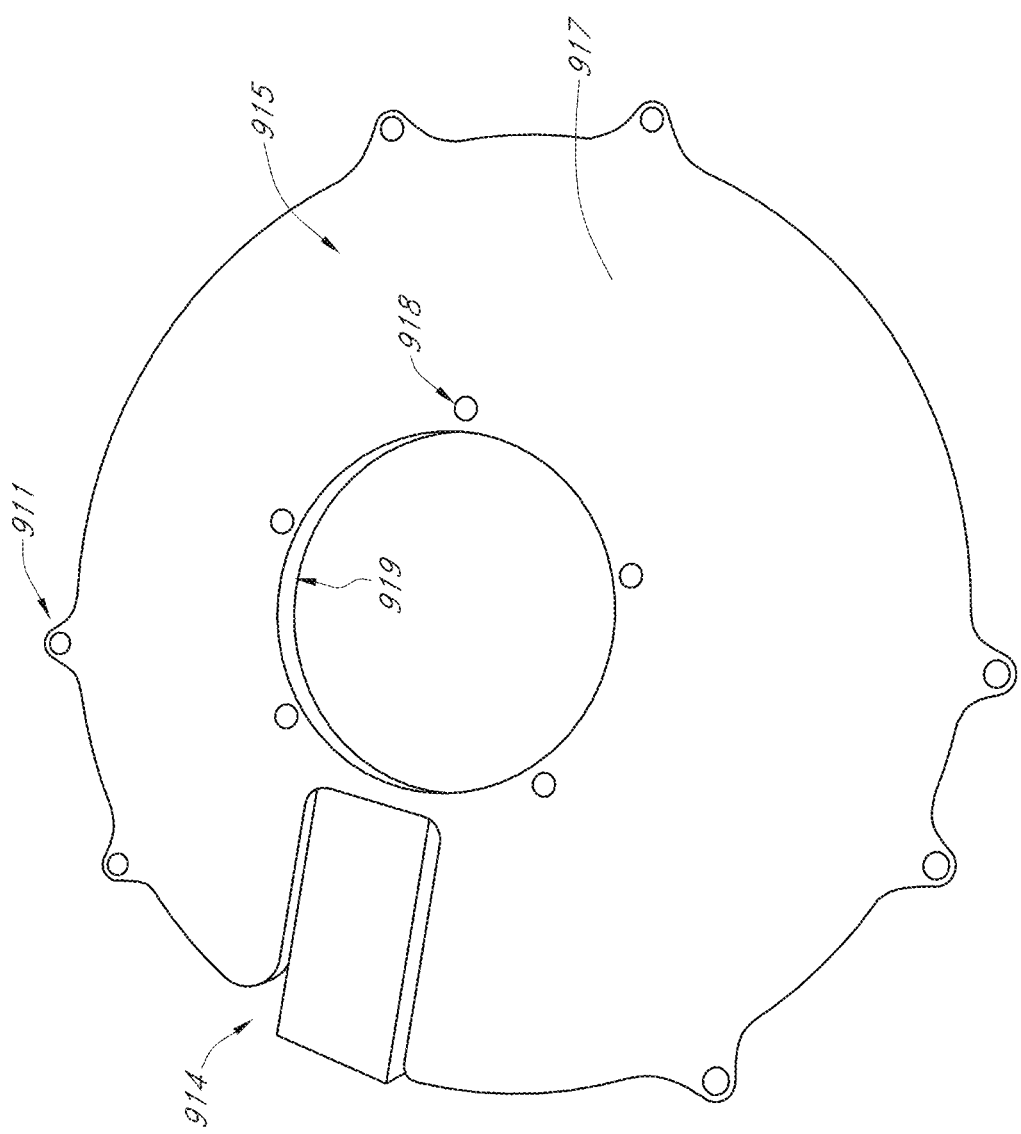
FIG. 6 is a schematic planar view of a rear surface of the resistor case of FIG. 5.

FIG. 6 shows a rear side 915 of the case 910 opposite the front side 913. The rear side 915 can define a generally annular (e.g., doughnut shaped) surface 917 between the curved inner wall 916 and curved outer wall 910A of the case 910. Optionally, the surface 917 is substantially planar (e.g., is flat). The faster openings 911, 918 can extend through the case 910 from the front side 913 to the rear side 915.

Figure 13:
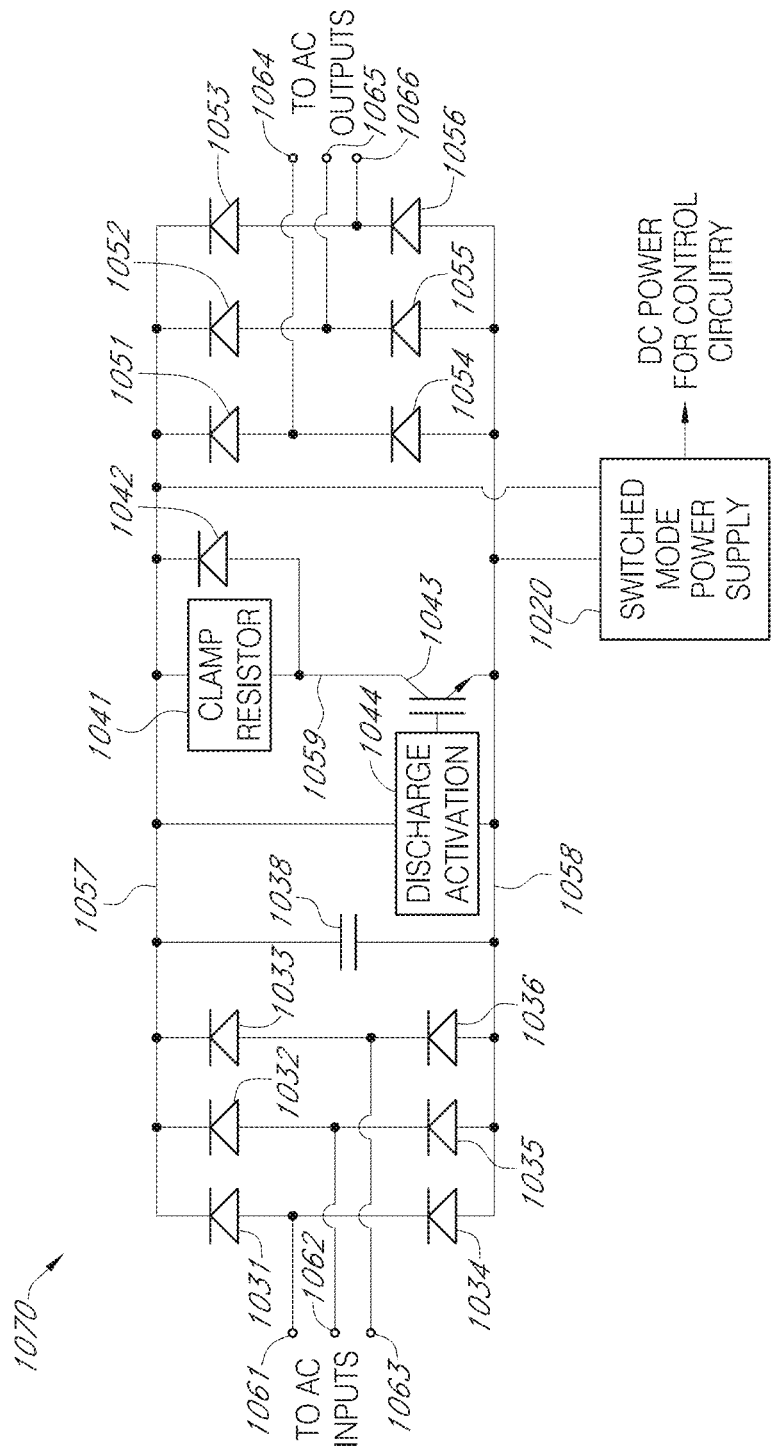
FIG. 13 is a schematic diagram of one embodiment of a clamp for a matrix converter.

FIG. 7 shows the end-plate 400 with the resistor assembly 900 (e.g., clamp resistor assembly) installed in a cavity or chamber 420 of the end-plate 400 defined between a circumferential outer wall 450 and an end wall 460 so that a hub 465 of the end-plate 400 extends through the central opening 919 of the case 910, the surface 917 is adjacent (e.g., in contact with) the end wall 460 of the end-plate 400, and fasteners (e.g., screws, bolts) extend through the fastener openings 911, 918 of the case 910 to couple the case 910 to the end-plate 400 (e.g., to the end wall 460 of the end-plate 400). The input and output connectors 921, 922 can be connected to other electronics in the end-plate 400 (e.g., to the electronic module 700 (discussed further below) via electrical connectors or cables. As shown in FIG. 7, modules 472, 474, 476, 478, 480, 482 are arranged circumferentially in the chamber 420, mounted on the end wall 460. Each of these modules 472, 474, 476, 478, 480, 482 can include two diodes, and can each implement one of the diode pairs 1031/1034, 1032/1035, 1033/1036, 1051/1054, 1052/1055, and 1053/1056 (see FIG. 13). For example, in one embodiment, the module 472 implements diode pair 1031/1034, the module 474 implements diode pair 1051/1054, the module 476 implements diode pair 1032/1035, the module 478 implements diode pair 1052/1055, the module 480 implements diode pair 1033/1036, and the module 482 implements diode pair 1053/1056. Another module 484 is connected to the resistor assembly 910. The module 484 includes the clamp IGBT 1043 and the clamp diode 1042. The resistor assembly 910 is connected to the terminals of the module 484 such that the resistor assembly 910 is connected in parallel with the clamp diode 1042 and in series with the clamp IGBT 1043, as shown in FIG. 13. The resistor assembly 910 connects to the terminals on the module 484 via a printed circuit board that bolts down through leads on the resistor assembly 910, including the leads 921, 922, to establish the appropriate connections.

Figure 8:
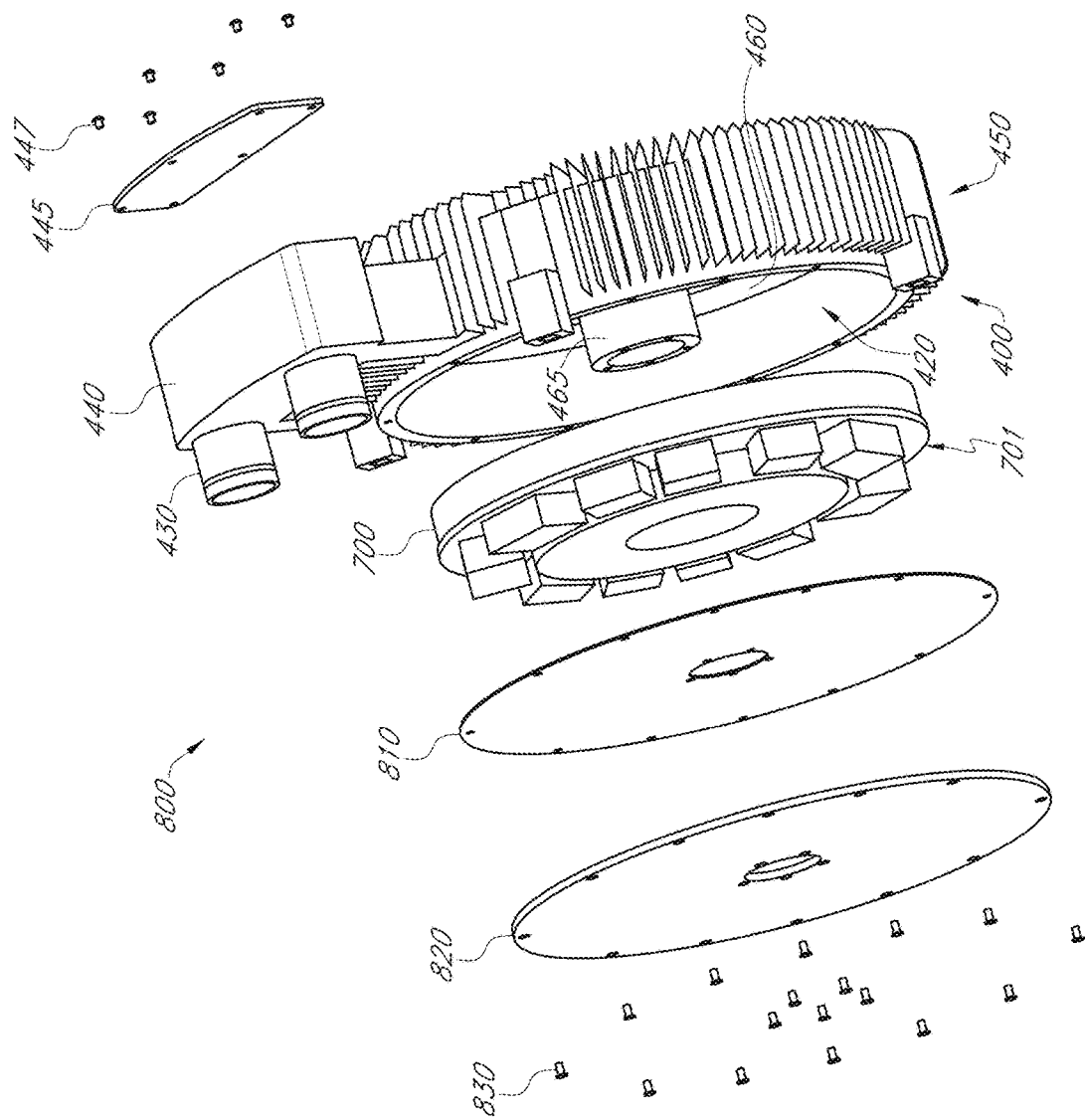
FIG. 8 is an exploded view of an end-plate assembly of the motor assembly and the drive module electronics therein.

FIG. 8 shows an exploded view of a drive module assembly 800 of the electric motor assembly 1000. The drive module assembly 800 includes the end-plate 400 with the cavity or chamber 420 defined at least in part by the end wall 460 and circumferential outer wall 450. The end-plate 400 also has a hub 465 that defines the opening 410 at the center of the end-plate 400, and also includes the terminal box connector 440 with the channels 430 that receive the connector wires 610 of the terminal box 600. A connector cover 445 can be attached to the terminal box connector 440 with one or more fasteners 447 (e.g., screws, bolts). The drive module assembly 800 also includes the electronics module 700, discussed further below, which can be housed in the chamber 420. The chamber 420 has a generally circular shape and receives a similarly shaped electronic module 700 therein. Once the electronic module 700 is in the chamber 420, the chamber 420 can be covered with one or both of an end-plate cover gasket or insulator 810 and an end-plate cover 820 using one or more fasteners (e.g., bolts, screws) 830.

Figure 9:
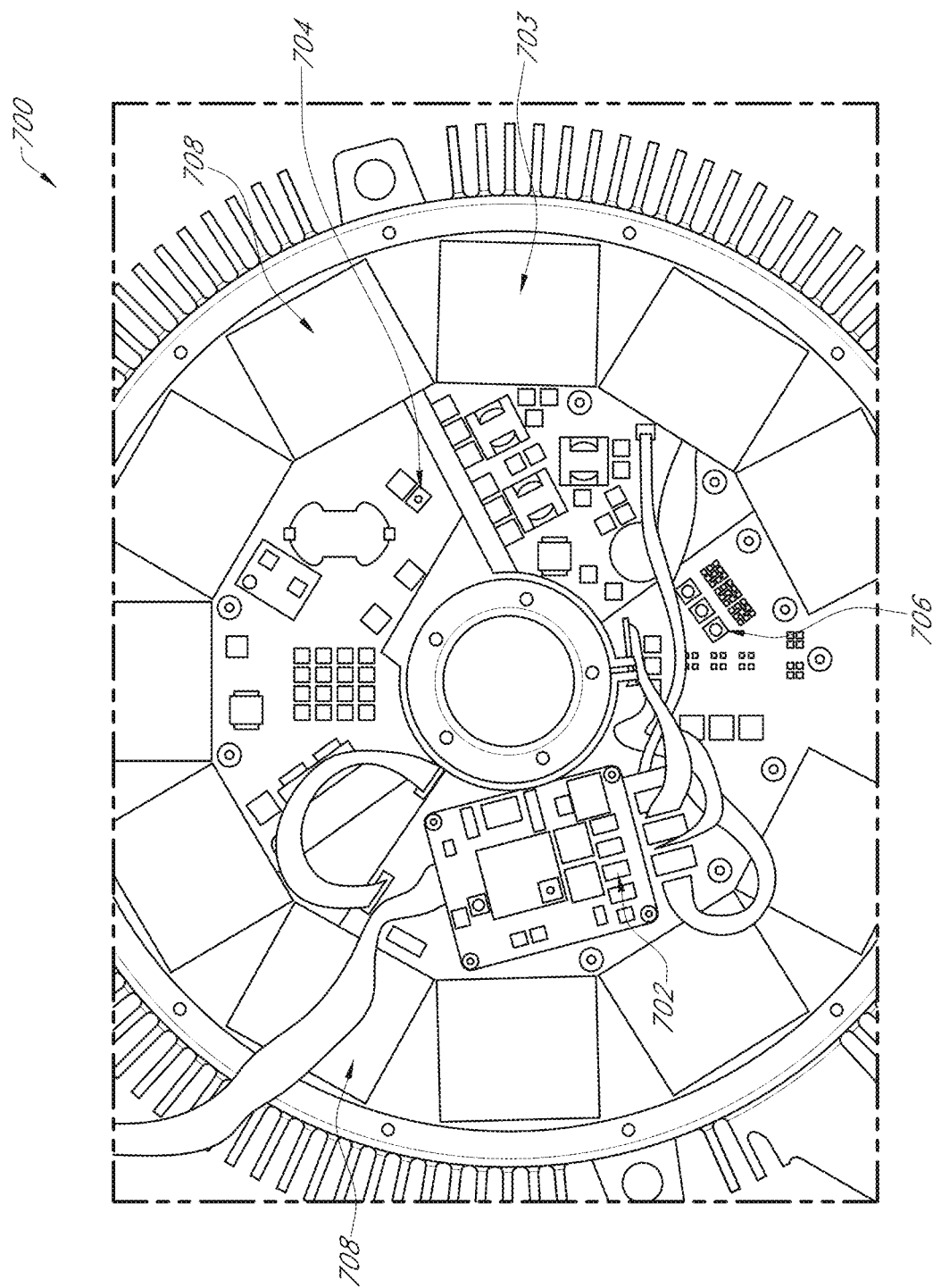
FIG. 9 is a partial view of a motor side of the end-plate assembly of FIG. 8.
Figure 10:
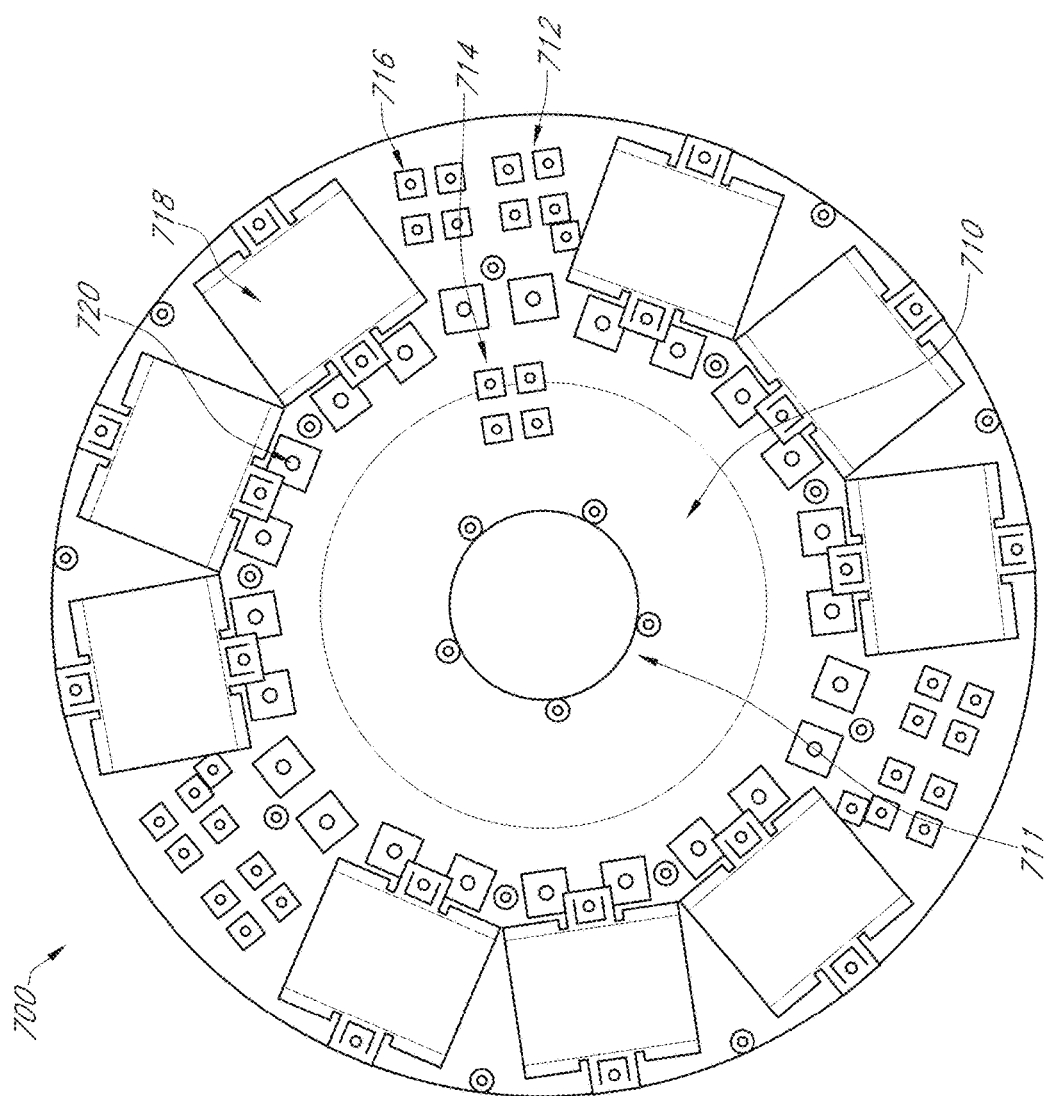
FIG. 10 is a rear view of a power plane printed circuit board layer housed in the end-plate assembly of FIG. 8.
Figure 11:
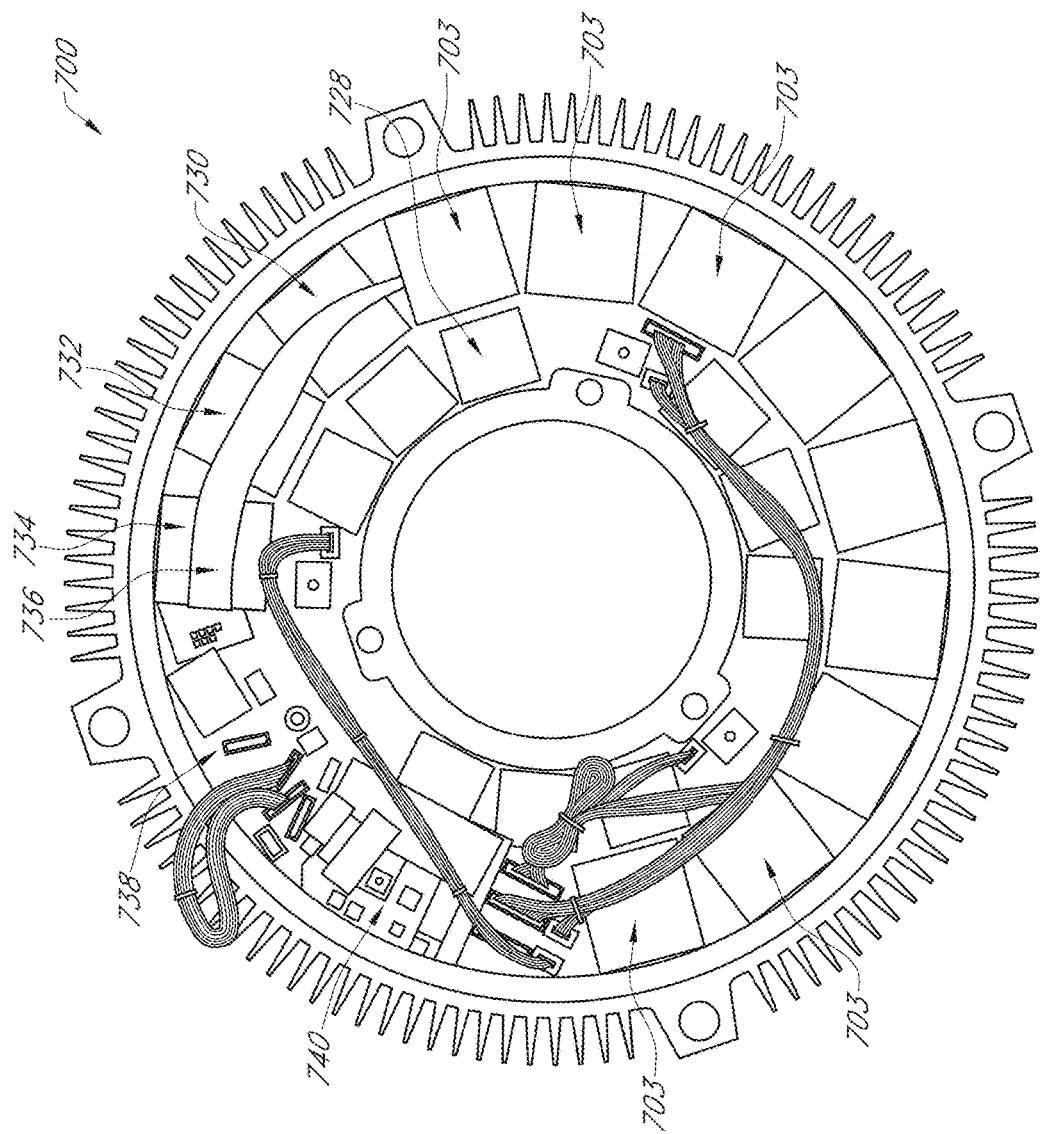
FIG. 11 shows an assembled matrix converted in the end-plate assembly of FIG. 8.

FIGS. 9-11 show features of the electronic module 700. The electronic module 700 can provide power and control functionality to operate the electric motor assembly 1000 in order to drive the pump or other rotary device coupled to the electric motor assembly 1000. The electronic module 700 can have a printed circuit board or power plane assembly 710 with a circular shape (e.g., annular shape with a central opening 711). The electronic module 700 can be disposed in the chamber 420 of the end-plate 400 so that the central opening 711 is disposed about the hub 465 and an outer edge 701 of the printed circuit board or power plane assembly 710 is disposed inward of the circumferential outer wall 450 of the end-plate 400. Accordingly, the electronics can be arranged circumferentially about the hub 465 on the printed circuit board or power plane assembly 710 so that the power and control electronics are housed in the chamber 420 of the end-plate 400.

The printed circuit board or power plane assembly 710 can be a multi-layer circuit board or assembly, and can be constructed of a laminated material, such as fiberglass, which can advantageously insulate the hotter power semiconductors from more temperature sensitive control electronics and power quality capacitors. For example, the printed circuit board or power plane assembly 710 can have a power layer, a control layer, a thermal barrier and a printed circuit board layer.

The power layer can include one or more higher temperature power modules (PM1-PM9) 718 operable to provide power to the electric motor 100. The control layer can include lower temperature control electronics modules, such as one or more power quality or input filter capacitors (IFC) 703 for controlling the power provided to the electric motor 100. The power modules (PM1-PM9) 718 can be on an opposite side of the printed circuit board or power plane assembly 710 (e.g., on opposite sides of the thermal barrier) from the power quality or input filter capacitors (IFC) 703. The thermal barrier and printed circuit board layer can be between the power layer and the control layer and provide electrical connection paths between the power modules 718 of the power plane and the control electronics modules (e.g., power quality or input filter capacitors 703) of the control layer, allowing the interconnection of these components. The printed circuit board or power plane assembly 710 also advantageously provides thermal insulation between the power layer and the control layer. The printed circuit board or power plane assembly 710 advantageously insulates and/or directs heat emitted from one or more of the power modules 718, the control electronics modules such as the input filter capacitors (IFC) 703 and output shaft or rotor 120 of the electric motor 100 to the outer edge 701 of the printed circuit board or power plane assembly 710 where higher air flow from the fan 500 is directed.

With reference to FIG. 9, the electronic module 700 can include, in addition to one or more (e.g., a plurality of) power quality or input filter capacitors (IFC) 703, a controller 702, a main power supply 704, a gate drive layer 706 and one or more clamp capacitors 708 on one side of the printed circuit board or power plane assembly 710. With reference to FIG. 10, the opposite side of the printed circuit board or power plane assembly 710 can include, in addition to the power modules 718, one or more output clamp diode connections 712, a clamp insulated-gate bipolar transistor (IGBT) connection 714, one or more shunt resistor connections 716, and one or more input filter capacitor (IFC) connections 720.

FIG. 11 shows a an assembled electronic module 700 arranged in the chamber 420 of the end-plate 400. The electronic module 700 includes one or more input filter capacitors 703, a gate driver power supply 728, one or more controller cards 740, one or more clamp capacitors 730, 732, 734 and a clamp control circuit 738, and a copper connection 736. The electronic module 700 can include a matrix converter to convert a multi-phase AC input of fixed voltage and frequency into a multi-phase AC output waveform of a desired frequency and phase. Therefore, the matrix converter is able to synthesize AC output waveforms of desired frequency and phase relative to the input AC waveforms. Since the rate at which electric motors, such as the electric motor 100 rotates is based on the frequency of the applied AC input signal, using a matrix converter to power the electric motor 100 allows for variable drive control. For example, the frequency of the AC output waveform provided by the matrix converter can be changed over time to thereby operate the electric motor 100 at the desired speed. The electronic module 700 provides an embedded motor drive (EMD) that operates similar to a variable frequency drive (VFD) and that controls the input frequency and voltage to the electric motor 100 to allow more precise speed control for the electric motor 100 (e.g., allowing the motor 100 to run at speeds higher than the input line frequency).

The embedded motor drive (EMD) advantageously provides for improved reliability, increased throughput and reduced energy consumption for the electric motor assembly 1000.

The circular shape of the electronic module 700 advantageously allows it to fit within the chamber 420 of the end-plate 400, allowing ease of manufacture and installation of its components. As the end-plate 400 can be detached from the motor frame 200, maintenance of the electronic module 700 (e.g., to replace one or more components, such as a faulty or damaged transistor) is simplified. Additionally, the circular shape of the electronic module 700 allows existing electric motor assemblies to be retrofitted with the electronic module 700 to provide such an assembly with the embedded motor drive or variable frequency drive provided by the electronic module 700 (e.g., by installing the electronic module 700 in the standard sized end-plate of the electric motor assembly).

One drawback of conventional electric motors is that they are run at a fixed speed based on the input frequency of the AC power supply, and control of the rotational speed of a pump or other rotary device coupled to the electric motor is provided via mechanical structure (e.g., a brake, throttle valve), resulting in a waste of energy. Another drawback of existing electric motors is that the maximum speed of the electric motor is limited to the AC power supply's input frequency, thereby requiring a larger pump to be installed when increased pressure or flow of the pump is desired.

A matrix converter is a type of motor drive circuit that adjusts motor input frequency and voltage to control AC motor speed and torque as desired. For example, variable speed operation of an electric motor can improve reliability and throughput while reducing energy consumption.

A matrix converter receives a multi-phase AC input voltage, and opens and closes switches of a switch array over time to thereby synthesize a multi-phase AC output voltage with desired frequency and phase. Various circuits are used in a matrix converter for control functions. For instance, a processor and/or field programmable gate array (FPGA) can be used for computations related to a modulation algorithm that selects which particular switches of the array are opened or closed at a given moment, and switch drivers can be included to provide DC control signals to the control inputs of the switches.

The matrix converter can also include a clamp circuit that dissipates load energy (for instance, overvoltage conditions arising during shutdown) by clamping one or more inputs terminal of the matrix converter to one or more output terminals of the matrix converter. Including the clamp circuit enhances robustness, for instance, by providing a discharge path for excess load current and/or to handle overcurrent and shutdown conditions.

In certain embodiments herein, a matrix converter includes an array of switches having AC inputs that receives a multi-phase AC input voltage and AC outputs that provide a multi-phase AC output voltage to a load. The matrix converter further includes control circuitry that opens or closes individual switches of the array, and a clamp circuit connected between the AC inputs and AC outputs of the array and operable to dissipate energy of the load in response to an overvoltage condition. The clamp circuit includes a switched mode power supply operable to generate a DC supply voltage for the control circuitry.

Implementing the matrix converter in this manner provides a number of advantages, including an ability to maintain the control circuitry on for a longer duration of time when the AC input power is lost or of poor quality.

Figure 12:
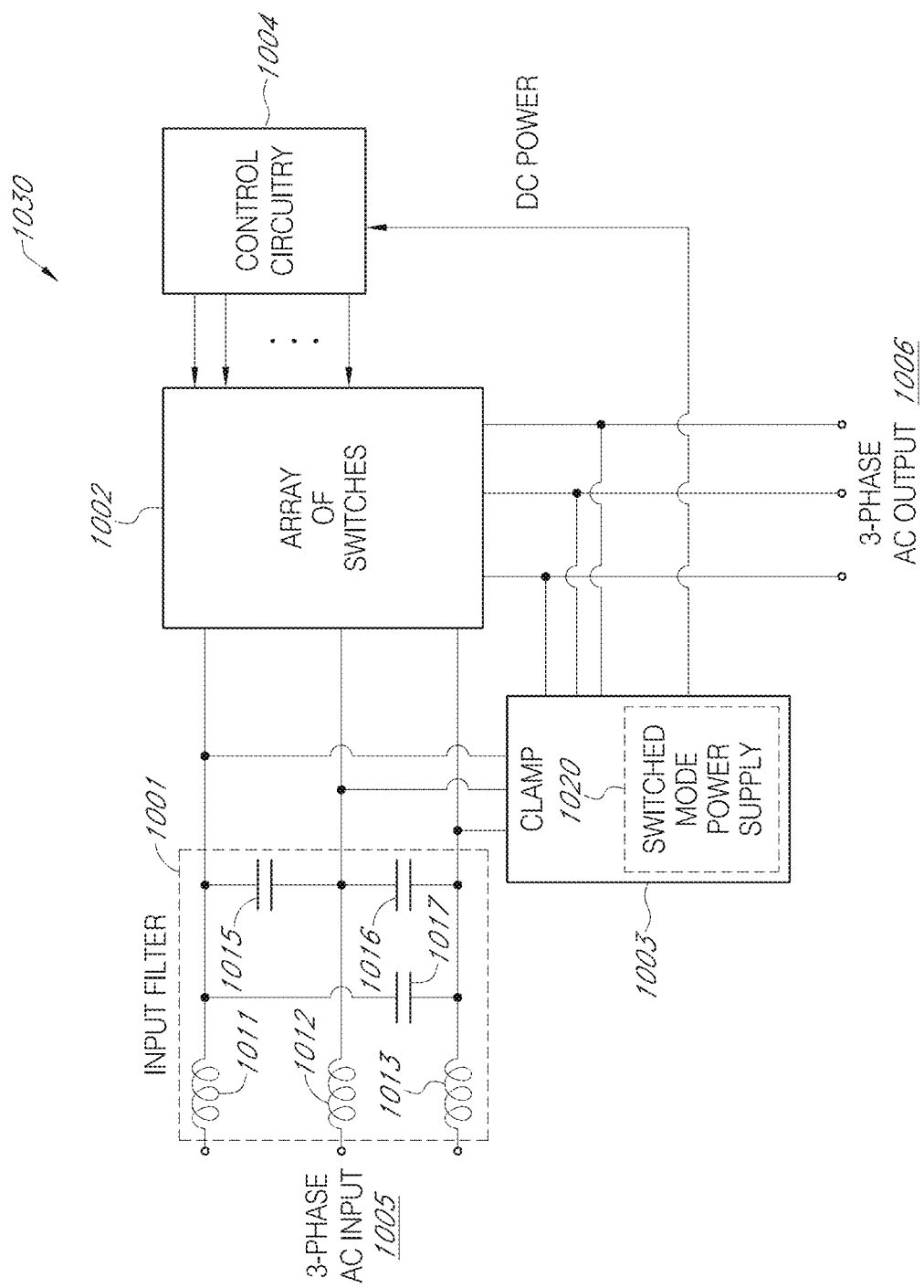
FIG. 12 is a schematic diagram of a matrix converter according to one embodiment.

FIG. 12 is a schematic diagram of a matrix converter 1030 according to one embodiment. The matrix converter includes an input filter 1001, an array of switches 1002, a clamp circuit 1003, control circuitry 1004, 3-phase AC input terminals 1005, and 3-phase AC output terminals 1006.

In the illustrated embodiment, the input filter 1001 is implemented as an inductor-capacitor (LC) filter that serves to filter a 3-phase AC input voltage received on the 3-phase AC input terminals 1005 to generate a filtered 3-phase AC input voltage for the array of switches 1002. The 3-phase AC input voltage can correspond to, for example, three AC input voltage waveforms received from a power grid and each having a phase separation of about 120° and a desired voltage amplitude (for instance, 240 V or other desired voltage).

As shown in FIG. 12, the input filter 1001 includes a first inductor 1011 connected between a first AC input terminal and a first AC input to the array of switches 1002, a second inductor 1012 connected between a second AC input terminal and a second AC input to the array of switches 1002, and a third inductor 1013 connected between a third AC input terminal and a third AC input to the array of switches 1002. The input filter 1001 further includes a first capacitor 1015 electrically connected between the first AC input and the second AC input of the array of switches 1002, a second capacitor 1016 electrically connected between the second AC input and the third AC input of the array of switches 1002, and a third capacitor 1017 electrically connected between the first AC input and the third AC input of the array of switches 1002.

Including the input filter 1001 provides a number of advantages, such as providing protection against pre-charge and/or inrush current during power-up. Although one implementation of an input filter is depicted, matrix converters can be implemented with input filters of a wide variety of types. Accordingly, other implementations are possible.

The control circuitry 1004 opens or closes individual switches of the array of switches 1002 over time to thereby provide a 3-phase AC output voltage to the 3-phase AC output terminals 1006 with a desired frequency and phase relative to the 3-phase AC input voltage. The control circuitry 1004 can include various circuits for control functions. In a first example, the control circuitry 1004 can include a processor and/or FPGA for computations related to a modulation algorithm used to select which particular switches of the array 1002 are opened or closed at a given moment. In a second example, the control circuitry 1004 can include switch drivers that provide DC control signals to the switches of the array 1002 to thereby open or close the switches as desired.

The clamp circuit 1003 is electrically connected between the AC inputs and AC outputs of the array of switches 1002, and operates to dissipate energy during shutdown of the matrix converter 1030 or other overvoltage conditions by clamping one or more input terminals of the matrix converter 1030 to one or more output terminals of the matrix converter 1030. Including the clamp circuit 1003 enhances robustness, for instance, by providing a discharge path for excess load current and/or to handle overcurrent and shutdown conditions. For example, the clamp circuit 1003 can prevent freewheel paths for load current during shutdown and/or current paths for over-current.

In the illustrated embodiment, the clamp circuit 1003 includes a switched mode power supply 1020 that serves to generate DC power for the control circuitry 1004. In certain implementations, the supply voltage input to the switched mode power supply 1020 is directly connected to at least one internal node of the clamp circuit 1003. For example, a first internal node of the clamp circuit 1003 can serve to provide an input voltage to the switched mode power supply 1020 while a second internal node of the clamp circuit 1003 can serve as a ground voltage to the switched mode power supply 1020.

A switched mode power supply is an electronic power supply that incorporates a switching regulator to convert electrical power efficiently. For example, a switched mode power supply can convert power using switching devices that are turned on and off at high frequencies, and storage components such as inductors or capacitors to supply power when the switching device is in a non-conductive state.

Providing the input voltage to the switched mode power supply 1020 from a node of the clamp circuit 1003 provides a number of advantages, including an ability to maintain the control circuitry 1004 on for a longer duration of time when the AC input power is lost or of poor quality.

FIG. 13 is a schematic diagram of one embodiment of a clamp circuit 1070 for a matrix converter. The clamp circuit 1070 includes a switched mode power supply 1020, a first input clamping diode 1031, a second input clamping diode 1032, a third input clamping diode 1033, a fourth input clamping diode 1034, a fifth input clamping diode 1035, a sixth input clamping diode 1036, a clamp capacitor 1038, a clamp resistor 1041, a clamp diode 1042, an insulated gate bipolar transistor (IGBT) 1043, a discharge activation circuit 1044, a first output clamping diode 1051, a second output clamping diode 1052, a third output clamping diode 1053, a fourth output clamping diode 1054, a fifth output clamping diode 1055, and a sixth output clamping diode 1056.

Although one embodiment of a clamp circuit for a matrix converter is depicted, the teachings herein are applicable to clamp circuits implemented in a wide variety of ways. Accordingly, other implementations are possible.

The clamp circuit 1070 includes a first group of terminals 1061-1063 that connect to the AC inputs of an array of switches, and a second group of terminals 1064-1066 that connect to the AC outputs of the array of switches. The first group of terminals 1061-1063 includes a first terminal 1061, a second terminal 1062, and a third terminal 1063. Additionally, the second group of terminals 1064-1066 includes a fourth terminal 1064, a fifth terminal 1065, and a sixth terminal 1066.

As shown in FIG. 13, the input clamping diodes 1031-1036 serve as an input diode array connecting the first discharge node 1057 and the second discharge node 1058 to the AC inputs 1061-1063, while the output clamping diodes 1051-1056 serve as an output diode array connecting the first discharge node 1057 and the second discharge node 1056 to the AC outputs 1064-1066.

In the illustrated embodiment, the first input clamping diode 1031, the second input clamping diode 1032, and the third input clamping diode 1033 include anodes electrically connected to the first terminal 1061, the second terminal 1062, and the third terminal 1063, respectively. Additionally, each of the first input clamping diode 1031, the second input clamping diode 1032, and the third input clamping diode 1033 includes a cathode electrically connected to the first discharge node 1057. Furthermore, the fourth input clamping diode 1034, the fifth input clamping diode 1035, and the sixth input clamping diode 1036 include cathodes electrically connected to the first terminal 1061, the second terminal 1062, and the third terminal 1063, respectively. Additionally, each of the fourth input clamping diode 1034, the fifth input clamping diode 1035, and the sixth input clamping diode 1036 includes an anode electrically connected to the second discharge node 1058. Furthermore, the clamp capacitor 1038 is electrically connected between the first discharge node 1057 and the second discharge node 1058.

With continuing reference to FIG. 13, the clamp resistor 1041 is electrically connected in series with the IGBT 1043 in a discharge path between the first discharge node 1057 and the second discharge node 1058. Although the IGBT 1043 illustrates one example of a discharge device, other implementations of discharge devices can be used.

The clamp resistor 1041 can be implemented in a wide variety of ways, including, but not limited to, using any of the embodiments of clamp resistors discussed above with reference to FIGS. 1-11. For example, implementing the clamp resistor 1041 with low inductance in accordance with the teachings herein inhibits large voltages from developing across the clamp resistor 1041 during clamping.

In the illustrated embodiment, the gate of the IGBT 1043 is controlled by the discharge activation circuit 1044. In certain implementations, the discharge activation circuit 1044 selectively turns on the IGBT 1043 based on monitoring a voltage difference between the first discharge node 1057 and the second discharge node 1058. For example, the discharge activation circuit 1044 can activate the IGBT 1043 when the voltage difference between the first discharge node 1057 and the second discharge node 1058 indicates an overvoltage condition. In certain implementations, the discharge activation circuit 1044 provides the control circuitry with an overvoltage sensing signal indicating whether or not overvoltage has been detected.

As shown in FIG. 13, the clamp diode 1042 is connected in parallel with the clamp resistor 1041, with an anode of the clamp diode 1042 electrically connected to an intermediate node 1059 along the discharge path. Additionally, the cathode of the clamp diode 1042 is electrically connected to first discharge node 1057. The clamp diode 1042 serves as a freewheeling path for any inductive voltage spike generated by the rapid switching of the IGBT 1043 (or other semiconductor discharge device) into a parasitic inductance of the clamp resistor 1041.

In the illustrated embodiment, the switched mode power supply 1020 receives an input supply voltage corresponding to a voltage difference between the first discharge node 1057 and the second discharge node 1058, and generates a regulated DC output voltage that powers control circuitry of a matrix converter. For example, the second discharge node 1058 can serve as a ground voltage to the switched mode power supply 1020, while the first discharge node 1057 can serve as the input supply voltage to switched mode power supply 1020. In certain implementations, the switched mode power supply 1020 is operable over a voltage range of at least 250 V DC to 1000 V DC, thereby enhancing performance in the presence of fluctuations in voltage of the first discharge node 1057 and/or the second discharge node 1058.

As shown in FIG. 13, the first output clamping diode 1051, the second output clamping diode 1052, and the third output clamping diode 1053 include anodes electrically connected to the fourth terminal 1064, the fifth terminal 1065, and the sixth terminal 1066, respectively. Additionally, each of the first output clamping diode 1051, the second output clamping diode 1052, and the third output clamping diode 1053 includes a cathode electrically connected to the first discharge node 1057. Furthermore, the fourth output clamping diode 1054, the fifth output clamping diode 1055, and the sixth output clamping diode 1056 include cathodes electrically connected to the fourth terminal 1064, the fifth terminal 1065, and the sixth terminal 1066, respectively. Additionally, each of the fourth output clamping diode 1054, the fifth output clamping diode 1055, and the sixth output clamping diode 1056 includes an anode electrically connected to the second discharge node 1058.

Figure 14:
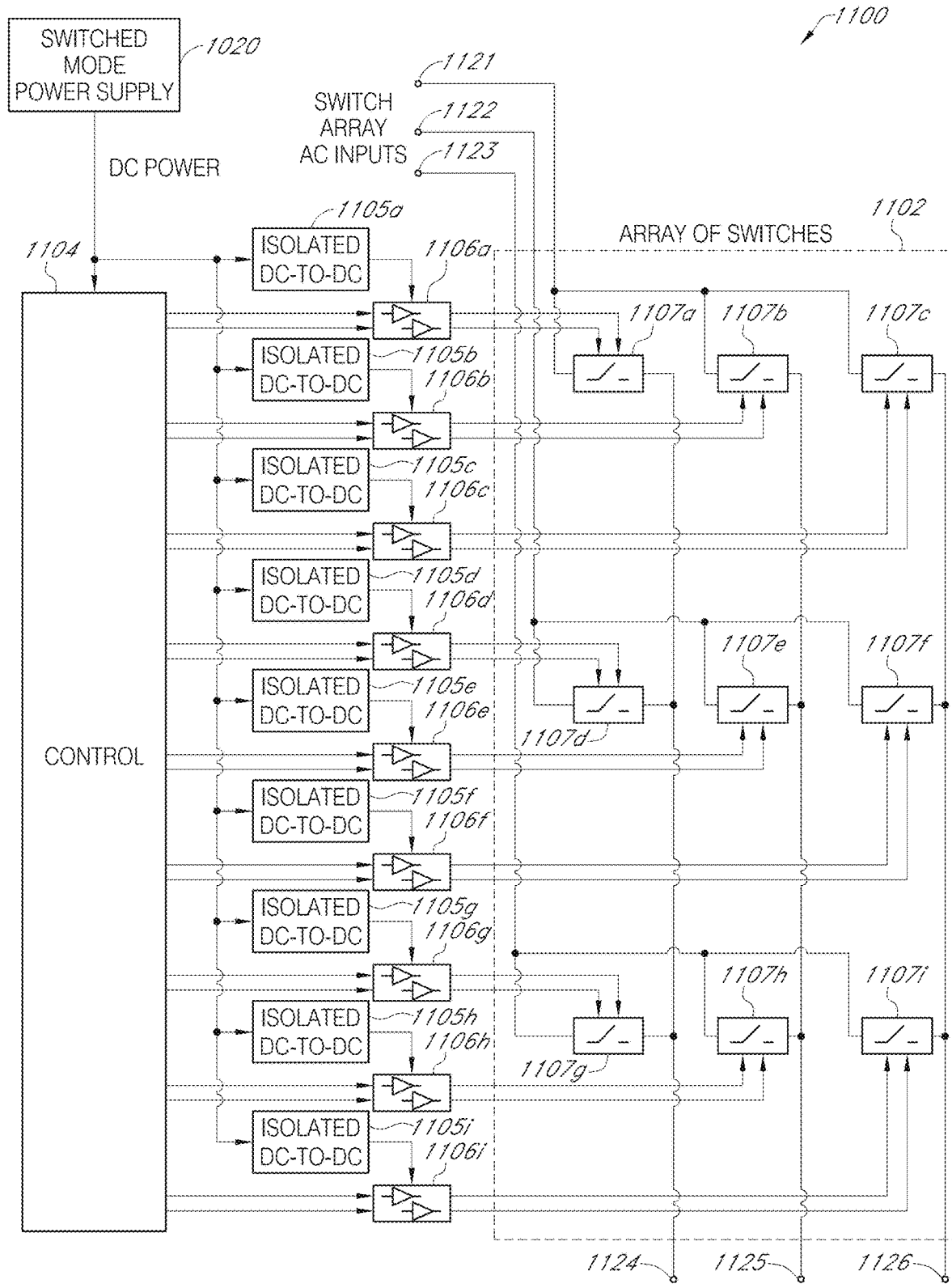
FIG. 14 is a schematic diagram of one embodiment of a portion of circuitry of a matrix converter.

FIG. 14 is a schematic diagram of one embodiment of a portion of circuitry 1100 of a matrix converter. The circuitry 1100 includes an array of switches 1102, switch drivers 1106a-1106i that drive bidirectional switches 1107a-1107i of the array 1102, a control circuit 1104 that generates input control signals to the switch drivers 1106a-1106i, isolated DC-to-DC converters 1105a-1105i that power the switch drivers 1106a-1106i, and a switched mode power supply 1020 that powers the control circuit 1104 and the isolated DC-to-DC converters 1105a-1105i.

As shown in FIG. 14, the array of switches 1102 includes a first bidirectional switch 1107a connected between a first AC input 1121 and a first AC output 1124, a second bidirectional switch 1107b connected between the first AC input 1121 and a second AC output 1125, a third bidirectional switch 1107c connected between the first AC input 1121 and a third AC output 1126, a fourth bidirectional switch 1107d connected between the second AC input 1122 and the first AC output 1124, a fifth bidirectional switch 1107e connected between the second AC input 1122 and the second AC output 1125, a sixth bidirectional switch 1107f connected between the second AC input 1122 and the third AC output 1126, a seventh bidirectional switch 1107g connected between the third AC input 1123 and the first AC output 1124, an eighth bidirectional switch 1107h connected between the third AC input 1123 and the second AC output 1125, and a ninth bidirectional switch 1107i connected between the third AC input 1123 and the third AC output 1126.

The bidirectional switches 1107a-1107i serve to conduct both positive and negative currents, and are implemented to be able to block both positive and negative voltages.

As shown in FIG. 14, each of the bidirectional switches 1107a-1107i receive a pair of switch control signals. In particular, the bidirectional switches 1107a-1107i receive first to ninth pairs of switch control signals from switch drivers 1106a-1106i, respectively. The switch drivers 1106a-1106i receive first to ninth pairs of input signals from the control circuit 1104. By controlling the state of the input signals over time, the control circuit 1104 achieves a desired modulation algorithm, such as Venturini modulation, Alesina modulation, scalar modulation, fictitious DC-link modulation, and/or space vector modulator. Furthermore, the control circuit 1104 generates the input signals to provide current commutation and/or other desired switching properties.

In the illustrated embodiment, the switched mode power supply 1020 receives an input voltage from internal node(s) of a clamp circuit (not shown in FIG. 14) and generates a DC voltage that powers the control circuit 1104. Additionally, the DC voltage serves as an input to the isolated DC-to-DC converters 1105a-1105i, respectively. The isolated DC-to-DC converters 1105a-1105i in turn provide first to ninth DC voltages to the switch drivers 1106a-1106i, respectively. The isolated DC-to-DC converters 1105a-1105i can be implemented in a wide variety of ways, including, but not limited to, as flyback converters.

Figure 15A:
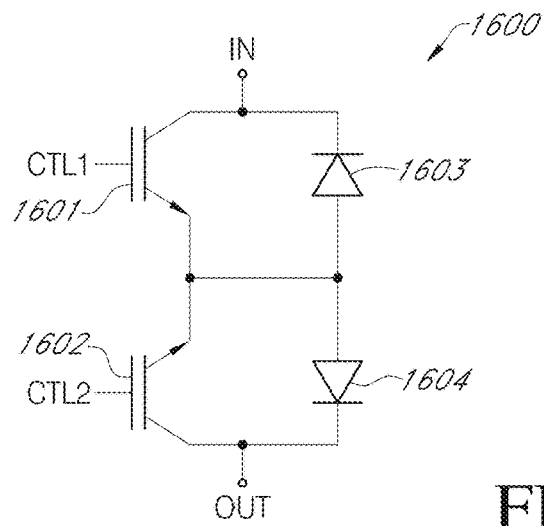
FIG. 15A is a schematic diagram of a bidirectional switch according to one embodiment.
Figure 15B:
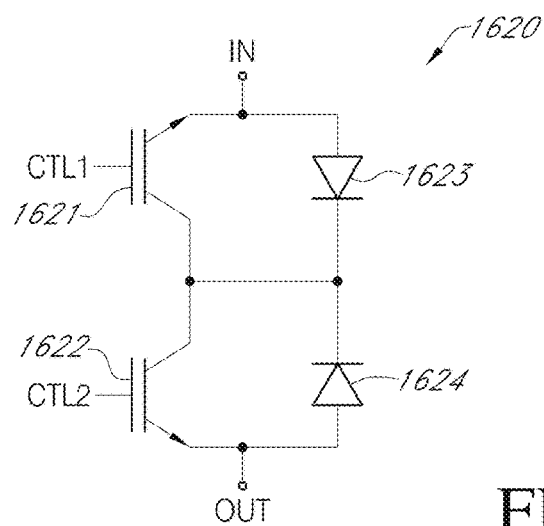
FIG. 15B is a schematic diagram of a bidirectional switch according to another embodiment.
Figure 15C:
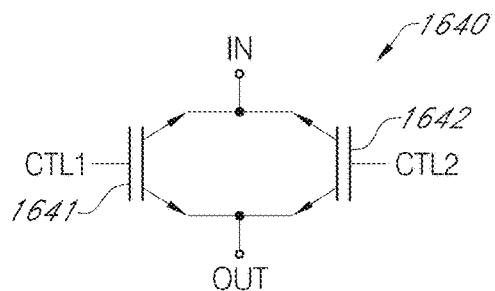
FIG. 15C is a schematic diagram of a bidirectional switch according to another embodiment.

FIGS. 15A-15C illustrate various embodiments of bidirectional switches for an array of switches of a matrix converter. Although various examples of bidirectional switches are shown, the teachings herein are applicable to bidirectional switches implemented in a wide variety of ways.

FIG. 15A is a schematic diagram of a bidirectional switch 1600 according to one embodiment. The bidirectional switch 1600 includes a first IGBT 1601, a second IGB2 1602, a first diode 1603, and a second diode 1604. The bidirectional switch 1600 is arranged in a common emitter back-to-back IGBT configuration.

As shown in FIG. 15A, the gate of the first IGBT 1601 receives a first control signal CTL1, and the gate of the second IGBT 1602 receives a second control signal CTL2. Additionally, the collector of the first IGBT 1601 is electrically connected to an input terminal IN and to a cathode of the first diode 1603, and the emitter of the first IGBT 1601 is electrically connected to the emitter of the second IGBT 1602 and to the anodes of the first diode 1603 and the second diode 1604. Furthermore, the collector of the second IGBT 1602 is electrically connected to an output terminal OUT and to a cathode of the second diode 1604.

FIG. 15B is a schematic diagram of a bidirectional switch 1620 according to another embodiment. The bidirectional switch 1620 includes a first IGBT 1621, a second IGBT 1622, a first diode 1623, and a second diode 1624. The bidirectional switch 1620 is arranged in a common collector back-to-back IGBT configuration.

As shown in FIG. 15B, the gate of the first IGBT 1621 receives a first control signal CTL1, and the gate of the second IGBT 1622 receives a second control signal CTL2. Additionally, the emitter of the first IGBT 1621 is electrically connected to an input terminal IN and to an anode of the first diode 1623, and the collector of the first IGBT 1621 is electrically connected to the collector of the second IGBT 1622 and to the cathodes of the first diode 1623 and the second diode 1624. Furthermore, the emitter of the second IGBT 1622 is electrically connected to an output terminal OUT and to an anode of the second diode 1624.

FIG. 15C is a schematic diagram of a bidirectional switch 1640 according to another embodiment. The bidirectional switch 1640 includes a first bidirectional IGBT 1641 and a second bidirectional IGBT 1642. The bidirectional switch 1640 is arranged in a reverse blocking IGBT configuration.

As shown in FIG. 15C, the gate of the first bidirectional IGBT 1641 receives a first control signal CTL1, and the gate of the second bidirectional IGBT 1642 receives a second control signal CTL2. Additionally, a collector/emitter of the first bidirectional IGBT 1641 is electrically connected to the input terminal IN and to the emitter/collector of the second bidirectional IGBT 1642, and an emitter/collector of the first bidirectional IGBT 1641 is electrically connected to the output terminal OUT and to the collector/emitter of the second bidirectional IGBT 1642. Thus, the first bidirectional IGBT 1641 and the second bidirectional IGBT 1642 serves as a pair of switching devices arranged in anti-parallel.

With respect to FIGS. 15A-15C, the first control signal CTL1 and the second control signal CTL2 are provided by a switch driver. Additionally, the input terminal IN couples to an AC input of a switch array, while the output terminal OUT couples to an AC output of a switch array.

Figure 16:
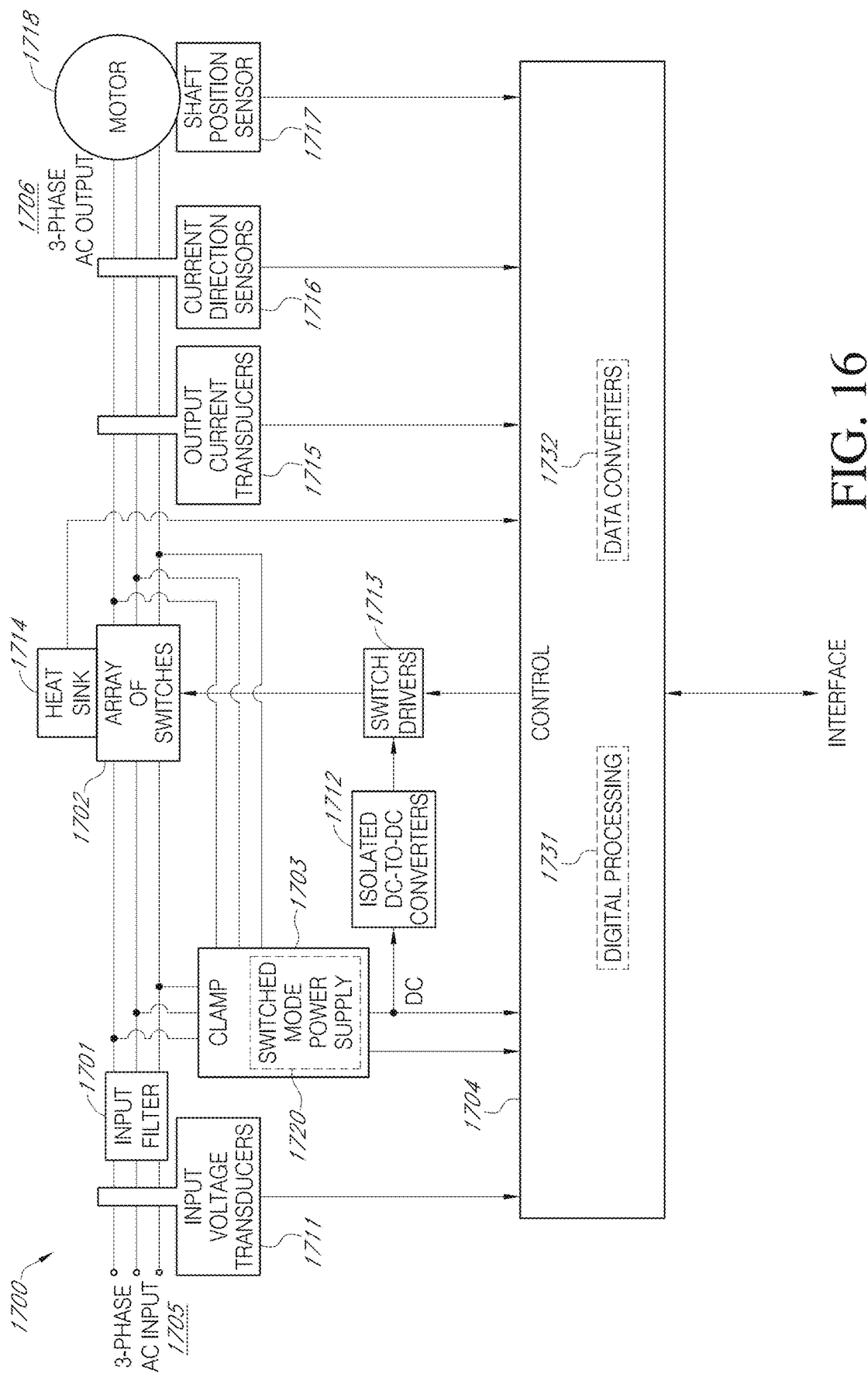
FIG. 16 is a schematic diagram of a matrix converter according to another embodiment.

FIG. 16 is a schematic diagram of a matrix converter 1700 according to another embodiment. The matrix converter 1700 is providing power to a motor 1718, and includes an input filter 1701, an array of switches 1702, a clamp circuit 1703, a control circuit 1704, 3-phase AC input terminals 1705, 3-phase AC output terminals 1706, input voltage transducers 1711, isolated DC-to-DC converters 1712, switch drivers 1713, a heat sink 1714, output current transducers 1715, current direction sensors 1716, and a shaft position sensor 1717.

As shown in FIG. 16, the clamp circuit 1703 includes a switched mode power supply 1720 that generates a regulated DC voltage that powers the control circuit 1704 and that serves as an input voltage to the isolated DC-to-DC converters 1712. The isolated DC-to-DC converters 1712 (for instance, flyback converters) output DC voltages that power the switch drivers 1713.

With continuing reference to FIG. 16, the control circuit 1714 is electrically connected to an interface, such as a serial interface or bus. The interface can connect to a network to facilitate remote control over the matrix converter 1700 and motor 1718. Additionally, the control circuit 1714 includes digital processing circuitry 1731 (for instance, a processor and/or FPGA) that digitally processes data, and data converters 1732 that provide analog-to-digital conversion and digital-to-analog conversion operations. For example, the data converters 1732 can serve to provide conversion of signals received from the depicted sensors and transducers.

The control circuit 1714 receives a variety of signals that indicate operating conditions of the matrix converter 1700. For example, in the illustrated embodiment, the control circuit 1714 receives input voltage sensing signals from the input voltage transducers 1711, an overvoltage sensing signal from the clamp circuit 1703 (for example, from a discharge activation circuit of the clamp circuit 1703), a temperature sensing signal from the heat sink 1714, output current sensing signals from the output current transducers 1715, current direction sensing signals from the current direction sensors 1716, and a shaft position sensing signal from the shaft position sensor 1717.

Implementing the matrix converter 1700 with such sensors provides a number of functions, such as over-current trip protection, over-voltage trip protection, thermal trip protection, and/or enhanced control over rotation, torque, and/or speed of the motor 1718.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An embedded motor drive including direct AC-AC matrix converter, the embedded motor drive comprising:
    a motor drive housing configured to mount to a motor frame of an electric motor;
    an electronics module comprising:
        a switch array having a plurality of AC inputs configured to receive a multi-phase AC input voltage and a plurality of AC outputs configured to output a multi-phase AC output voltage, the switch array comprising a plurality of bidirectional switches, plurality of AC inputs connected through the switch array to the plurality of AC outputs without an intermediate DC stage;
        a plurality of driver circuits each configured to control a respective one of the plurality of bidirectional switches;
        a control circuit configured to provide a plurality of input signals to the plurality of driver circuits; and
        a clamp circuit electrically connected at an input of the clamp circuit to the plurality of AC inputs and at an output of the clamp circuit to the plurality of AC outputs such that the clamp circuit is externally connected to AC nodes of the switch array, the clamp circuit comprising a switched mode power supply attached to a discharge node of the clamp circuit, the discharge node in a direct discharge current path, the switched mode power supply operable to generate a DC supply voltage for the control circuit, wherein the switched mode power supply is operable over a voltage range of at least 250 V DC, wherein the electronics module is dimensioned to fit within the motor drive housing.

2. The direct AC-AC matrix converter of claim 1, wherein the clamp circuit further comprises an input diode array connected to the plurality of AC inputs, and an output diode array connected to the plurality of AC outputs.

3. The direct AC-AC matrix converter of claim 1, further comprising a plurality of isolated DC-to-DC converters each configured to receive the DC supply voltage and to generate a converted DC voltage for a respective one of the plurality of driver circuits.

4. The direct AC-AC matrix converter of claim 1, wherein the clamp circuit comprises a clamp resistor in series with a discharge device configured to discharge current in response to detection of an overvoltage condition.

5. The direct AC-AC matrix converter of claim 4, wherein discharge current flows through a discharge path that does not include any capacitors.

6. The direct AC-AC matrix converter of claim 4, wherein the clamp circuit further comprises a diode electrically connected in parallel with the clamp resistor.

7. A motor drive assembly including a motor drive circuit of an electric motor, comprising:
a motor drive housing configured to mount to a motor frame of an electric motor;
a motor drive circuit comprising:
a plurality of AC inputs;
a plurality of AC outputs;
a direct AC-AC matrix converter comprising:
an array of switches connected to the plurality of AC inputs and configured to receive a multi-phase AC input voltage from the plurality of AC inputs, and the array of switches configured to output a multi-phase AC output voltage at the plurality of AC outputs, the plurality of AC inputs connected through the array of switches to the plurality of AC outputs without an intermediate DC stage;
control circuitry configured to control the array of switches to synthesize the multi-phase AC output voltage from the multi-phase AC input voltage; and
a clamp circuit electrically connected at an input of the clamp circuit to the plurality of AC inputs and at an output of the clamp circuit to the plurality of AC outputs such that the clamp circuit is externally connected to AC nodes of the array of switches, the clamp circuit including a switched mode power supply attached to a discharge node of the clamp circuit, the discharge node in a direct discharge current path, the switched mode power supply operable to generate a DC supply voltage for the control circuitry, wherein the switched mode power supply is operable over a voltage range of at least 250 V DC, wherein the motor drive circuit is dimensioned to fit within the motor drive housing.

8. The motor drive circuit of claim 7, wherein the clamp circuit comprises a clamp resistor in series with a discharge device configured to discharge current in response to detection of an overvoltage condition.

9. The motor drive circuit of claim 8, wherein discharge current flows through a discharge path that does not include any capacitors.

10. The motor drive circuit of claim 8, wherein the clamp circuit further comprises a diode electrically connected in parallel with the clamp resistor.

11. The motor drive circuit of claim 7, wherein the control circuitry comprises a digital processing circuit that is powered by the DC supply voltage.

12. The motor drive circuit of claim 7, wherein the array of switches comprises a plurality of bidirectional switches electrically connected between the plurality of AC inputs and the plurality of AC outputs, the direct AC-AC matrix converter further comprising a plurality of driver circuits each configured to control a respective one of the plurality of bidirectional switches.

13. The motor drive circuit of claim 12, wherein the control circuitry comprises a digital processing circuit that is powered by the DC supply voltage and operable to provide a plurality of input signals to the plurality of driver circuits.

14. The motor drive circuit of claim 13, further comprising a plurality of isolated DC-to-DC converters each configured to receive the DC supply voltage, the plurality of isolated DC-to-DC converters each configured to generate a converted DC voltage for a respective one of the plurality of driver circuits.

15. A motor assembly including the motor drive assembly of claim 7, wherein the motor drive housing is supported by a motor frame of the motor assembly.

16. The motor assembly of claim 15 wherein the motor drive housing is removably mountable to the motor frame.

17. A method of supplying DC power in a direct AC-AC matrix converter, the method comprising:
controlling an array of switches using control circuitry to synthesize a multi-phase AC output voltage from a multi-phase AC input voltage, the array of switches including a plurality of AC inputs configured to receive the multi-phase AC input voltage and a plurality of AC outputs configured to output the multi-phase AC output voltage, the plurality of AC inputs connected through the array of switches to the plurality of AC outputs without an intermediate DC stage;
activating a clamp circuit connected at an input of the clamp circuit to the plurality of AC inputs of the array of switches and to the plurality of AC outputs of the array of switches such that the clamp circuit is externally connected to AC nodes of the array of switches; and
generating a DC supply voltage for the control circuitry using a switched mode power supply of the clamp circuit, the switched mode power supply attached to a discharge node of the clamp circuit, the discharge node in a direct discharge current path, wherein the switched mode power supply is operable over a voltage range of at least 250 V DC, wherein the direct AC-AC matrix converter is contained within a motor drive mounted to a motor frame of an electric motor.

18. The method of claim 17, wherein activating the clamp circuit further comprises turning on a discharge device in response to detecting an overvoltage condition.

19. The method of claim 18, further comprising selectively turning on the discharge device based on detecting the overvoltage condition by comparing a voltage difference between two nodes to a threshold.

20. The method of claim 17, wherein controlling the array of switches using the control circuitry comprises controlling a plurality of bidirectional switches of the array using a plurality of switch drivers providing a plurality of input signals to the plurality of switch drivers using a control circuit, and powering the control circuit using the DC supply voltage.

21. The method of claim 20, further comprising providing the DC supply voltage to each of a plurality of isolated DC-to-DC converters, and powering each of the plurality of switch drivers with a converted DC voltage from a respective one of the plurality of isolated DC-to-DC converters.

* * * * *